(12) United States Patent
Byun et al.

(10) Patent No.: US 11,057,753 B2
(45) Date of Patent: Jul. 6, 2021

(54) METHOD AND DEVICE FOR PERFORMING V2X COMMUNICATION

(71) Applicant: LG ELECTRONICS INC., Seoul (KR)

(72) Inventors: Daewook Byun, Seoul (KR); Jian Xu, Seoul (KR); Taehun Kim, Seoul (KR); Jaewook Lee, Seoul (KR); Laeyoung Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 7 days.

(21) Appl. No.: 16/339,930

(22) PCT Filed: Sep. 28, 2017

(86) PCT No.: PCT/KR2017/010887
§ 371 (c)(1),
(2) Date: Apr. 5, 2019

(87) PCT Pub. No.: WO2018/066905
PCT Pub. Date: Apr. 12, 2018

(65) Prior Publication Data
US 2020/0053525 A1    Feb. 13, 2020

Related U.S. Application Data

(60) Provisional application No. 62/405,807, filed on Oct. 7, 2016, provisional application No. 62/418,013, filed on Nov. 4, 2016.

(51) Int. Cl.
*H04W 4/40* (2018.01)
*H04W 76/23* (2018.01)
(Continued)

(52) U.S. Cl.
CPC ............. *H04W 4/40* (2018.02); *H04W 76/14* (2018.02); *H04W 76/23* (2018.02); *H04W 80/10* (2013.01)

(58) Field of Classification Search
None
See application file for complete search history.

(56) References Cited

U.S. PATENT DOCUMENTS

2013/0095796 A1\* 4/2013 Cho .................... H04W 12/037
455/411
2013/0279394 A1\* 10/2013 Aramoto ............... H04L 12/189
370/312

(Continued)

FOREIGN PATENT DOCUMENTS

KR    10-1175612 B1    8/2012
WO    2016-144147 A    9/2016

OTHER PUBLICATIONS

RP-161894. 3GPP TSG RAN Meeting #73. Revised WI proposal: LTE-based V2X Services. Sep. 2016. (Year: 2016).\*

(Continued)

*Primary Examiner* — Andre Tacdiran
(74) *Attorney, Agent, or Firm* — Dentons US LLP

(57) ABSTRACT

Provided are a method by which a base station performs vehicle to everything (V2X) communication in a wireless communication system, and an apparatus for supporting the same. The method can comprise the steps of: receiving a V2X bearer indication indicating a V2X bearer, wherein the V2X bearer is a bearer used for a V2X service; determining that the base station supports only a PC5-based V2X service between the PC5-based V2X service or a Uu-based V2X service; postponing a resource allocation for the V2X bearer; and transmitting, to a mobility management entity (MME), information indicating that the resource allocation for the V2X bearer is postponed.

2 Claims, 19 Drawing Sheets

(51) Int. Cl.
*H04W 76/14* (2018.01)
*H04W 80/10* (2009.01)

(56) References Cited

U.S. PATENT DOCUMENTS

| | | | | |
|---|---|---|---|---|
| 2013/0287012 | A1* | 10/2013 | Pragada | H04W 76/25 370/338 |
| 2013/0343261 | A1* | 12/2013 | Gonsa | H04L 5/001 370/315 |
| 2014/0016614 | A1* | 1/2014 | Velev | H04W 36/165 370/331 |
| 2016/0002649 | A1 | 1/2016 | Kudithipudi et al. | |
| 2016/0050545 | A1* | 2/2016 | Chandramouli | H04W 4/06 370/328 |
| 2016/0088617 | A1* | 3/2016 | Goldhamer | H04L 1/18 370/330 |
| 2016/0295624 | A1 | 10/2016 | Novlan et al. | |
| 2016/0309522 | A1* | 10/2016 | Li | H04W 76/40 |
| 2017/0251341 | A1* | 8/2017 | Frost | H04W 72/005 |
| 2019/0222967 | A1* | 7/2019 | Ratilainen | H04L 1/0011 |

OTHER PUBLICATIONS

3rd Generation Partnership Project; Technical Specification Group Services and System Aspects; General Packet Radio Service (GPRS) enhancements for Evolved Universal Terrestrial Radio Access Network (E-UTRAN) access (Release 13); 3GPP TS 23.401 V13.6.1 (Mar. 2016) Section 5.4.4.2 (http://www.3gpp.org).

Huawei, HiSilicon, "Configuration of PC5 and/or Uu for V2V transport", 3GPP TSG-RAN WG2 Meeting #93bis, Apr. 11-15, 2016, R2-162289.

Huawei, HiSilicon, "Interface Selection between PC5 and Uu", 3GPP TSG RAN WG2 Meeting #95-bis, Oct. 10-14, 2016, R2-166301.

ZTE, "Discussion on the necessity of V2X path configuration signaling", 3GPP TSG-RAN WG2 Meeting #95bis, Oct. 10-14, 2016, R2-166605.

Huawei, "Interface Switching between Uu and PC5", 3GPP TSG-RAN3 Meeting #92, May 23-27, 2016, R3-161172.

Samsung, "Coexistence of Uu and PC5 Operation", R2-166464, 3GPP TSG RAN WG2 Meeting #95bis, Kaohsiung, Taiwan, Sep. 30, 2016 (http://www.3gpp.org/ftp/tsg_ran/WG2 RL2ITSGR2_95bis/Docs/).

CATT. "Discussion of PC5 and Uu Path Configuration", R2-166184, 3GPP TSG RAN WG2 Meeting #95bis, Kaohsiung. Taiwan, Oct. 1, 2016 (http://www.3gpp.orgiftp/tsg_ran/WG2 RL2/TSGR2_95bis/Docs/).

Search Report of European Patent Office in Appl'n No. 17858699.6, dated Jul. 17, 2019.

International Search Report from PCT/KR2017/010887, dated Jan. 12, 2018.

* cited by examiner

METHOD AND DEVICE FOR PERFORMING V2X COMMUNICATION

CROSS-REFERENCE TO RELATED APPLICATIONS

This application is the National Stage filing under 35 U.S.C. 371 of International Application No. PCT/KR2017/010887, filed on Sep. 28, 2017, which claims the benefit of U.S. Provisional Applications No. 62/405,807 filed on Oct. 7, 2016, and No. 62/418,013 filed on Nov. 4, 2016, the contents of which are all hereby incorporated by reference herein in their entirety.

BACKGROUND OF THE INVENTION

Field of the Invention

The present invention relates to a wireless communication system and, most particularly, a method for postponing resource allocation for a vehicle to everything (V2X) bearer and a device for supporting the same.

Related Art

In recent years, there is growing interest in a Device-to-Device (D2D) technology performing direct communication between devices. In particular, the D2D is attracting attention as a communication technology for a public safety network. A commercial communication network has been rapidly changed to the LTE but a current public safety network is on the basis of a 2G technology in a collision problem and a cost side with an existing communication standard. Request for the technology clearance and an improved service induces an effort to improve the public safety network.

The public safety network has high service requirements (reliability and security) as compared with a commercial communication network. In particular, when coverage of cellular communication is insufficient or is not used, there is a need for direct signal transmission/reception between devices, that is, a D2D operation.

The D2D operation may be signal transmission/reception between adjacent devices to have various advantages. For example, a D2D UE may perform data communication with a high transmission rate and low delay. Further, the D2D operation may distribute traffic converged in a base station. If the D2D UE serves as a relay, the D2D UE may serve to extend coverage of a base station.

Vehicle to everything (V2X) is a technology that combines mobility to a D2D technology to enable vehicles to continuously communicate with a road infrastructure or other vehicles, while driving, to exchange useful information such as traffic conditions, and the like.

In order to meet the demand for wireless data traffic soring since the 4th generation (4G) communication system came to the market, there are ongoing efforts to develop enhanced 5th generation (5G) communication systems or pre-5G communication systems. For the reasons, the 5G communication system or pre-5G communication system is called the beyond 4G network communication system or post long-term evolution (LTE) system.

SUMMARY OF THE INVENTION

Technical Objects

Meanwhile, in case the base station is set to 'PC5 only' for the V2X transmission, the UE that has received the 'PC5 only' configuration may know that a V2X message cannot be transmitted via Uu interface. Additionally, the base station may not transmit the V2X message by using a V2X bearer. In this situation, since the traffic is not delivered (or conveyed) by using the V2X bearer, a non-release of the V2X bearer does not become a problem. Since the V2X bearer can be used while the UE is located in a network, which supports the V2X service, the V2X bearer is not required to be released while the UE is located in the network supporting the V2X service. This is because the release of the V2X bearer may cause generation of a signaling overhead. Therefore, a base station that is configured as 'PC5 only' needs to postpone the resource allocation for the V2X bearer. Additionally, a UE that is positioned in the base station being configured as 'PC5 only' needs to maintain the context of the V2X bearer instead of deactivating the context.

Technical Solutions

According to an exemplary embodiment, provided herein is a method for performing vehicle to everything (V2X) communication by a base station in a wireless communication system. The method may include the steps of receiving a V2X bearer indication indicating a V2X bearer, wherein the V2X bearer is a bearer being used for V2X service, determining that the base station supports only PC5-based V2X service, among PC5-based V2X service and Uu-based V2X service, postponing resource allocation of the V2X bearer, and transmitting information indicating a postponement of resource allocation for the V2X bearer to a mobility management entity (MME).

When the base station determines that only the PC5-based V2X service is supported, resource allocation for the V2X bearer may be postponed.

The method may further include the step of transmitting the information indicating postponement of resource allocation for the V2X bearer to a user equipment (UE). The base station may be a target base station, and information being transmitted to the UE may be transmitted to the UE via a source base station. The information may include an identifier (ID) of the V2X bearer.

The method may further include the steps of determining that the base station supports the Uu-based V2X service, and allocating resource for the V2X bearer. The method may further include the steps of establishing a DRB for the V2X service based on the resource being allocated for the V2X bearer, and transmitting information indicating establishment of the DRB for the V2X bearer to the MME.

According to another exemplary embodiment, provided herein is a method for performing vehicle to everything (V2X) communication by a device in a wireless communication system. The method may include the steps of receiving information indicating a postponement of resource allocation for a V2X bearer from a base station, wherein the V2X bearer is a bearer being used for V2X service, performing marking on the V2X bearer, wherein the marking indicates a postponement of a deactivation of the V2X bearer, and maintaining a context of the marked V2X bearer.

When the base station supports only PC5-based V2X service, among PC5-based V2X service and Uu-based V2X service, the resource allocation for the V2X bearer may be postponed by the base station.

The device may be a mobility management entity (MME). When the device is the MME, the method may further include the steps of receiving information indicating establishment of a DRB for the V2X bearer from the base station, and, when the information indicating establishment of a DRB is received, removing the marking on the V2X bearer.

The device may be a user equipment (UE). When the device is the UE, the method may further include the steps of receiving an RRC connection reconfiguration message from the base station, and, when the RRC connection reconfiguration message is received, removing the marking on the V2X bearer. An AS layer of the UE may notify the establishment of DRB for the V2X bearer to an NAS layer of the UE.

According to yet another exemplary embodiment, provided herein is a base station performing vehicle to everything (V2X) communication in a wireless communication system. The base station may include a memory, a transceiver, and a processor operatively connecting the memory and the transceiver. Herein, the processor may be configured to control the transceiver to receive a V2X bearer indication indicating a V2X bearer, wherein the V2X bearer is a bearer being used for V2X service, to determine that the base station supports only PC5-based V2X service, among PC5-based V2X service and Uu-based V2X service, to postpone resource allocation of the V2X bearer, and to control the transceiver to transmit information indicating a postponement of resource allocation for the V2X bearer to a mobility management entity (MME).

Effects of the Invention

Context of the V2X bearer may be maintained without being released.

DESCRIPTION OF EXEMPLARY EMBODIMENTS

The technology described below may be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA may be implemented with a radio technology such as universal terrestrial radio access (UTRA) or CDMA-2000. The TDMA may be implemented with a radio technology such as global system for mobile communications (GSM)/general packet ratio service (GPRS)/enhanced data rate for GSM evolution (EDGE). The OFDMA may be implemented with a radio technology such as institute of electrical and electronics engineers (IEEE) 802.11 (Wi-Fi), IEEE 802.16 (WiMAX), IEEE 802.20, evolved UTRA (E-UTRA), etc. IEEE 802.16m is evolved from IEEE 802.16e, and provides backward compatibility with a system based on the IEEE 802.16e. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE. 5G is an evolution of the LTE-A.

For clarity, the following description will focus on LTE-A. However, technical features of the present invention are not limited thereto.

Figure 1:
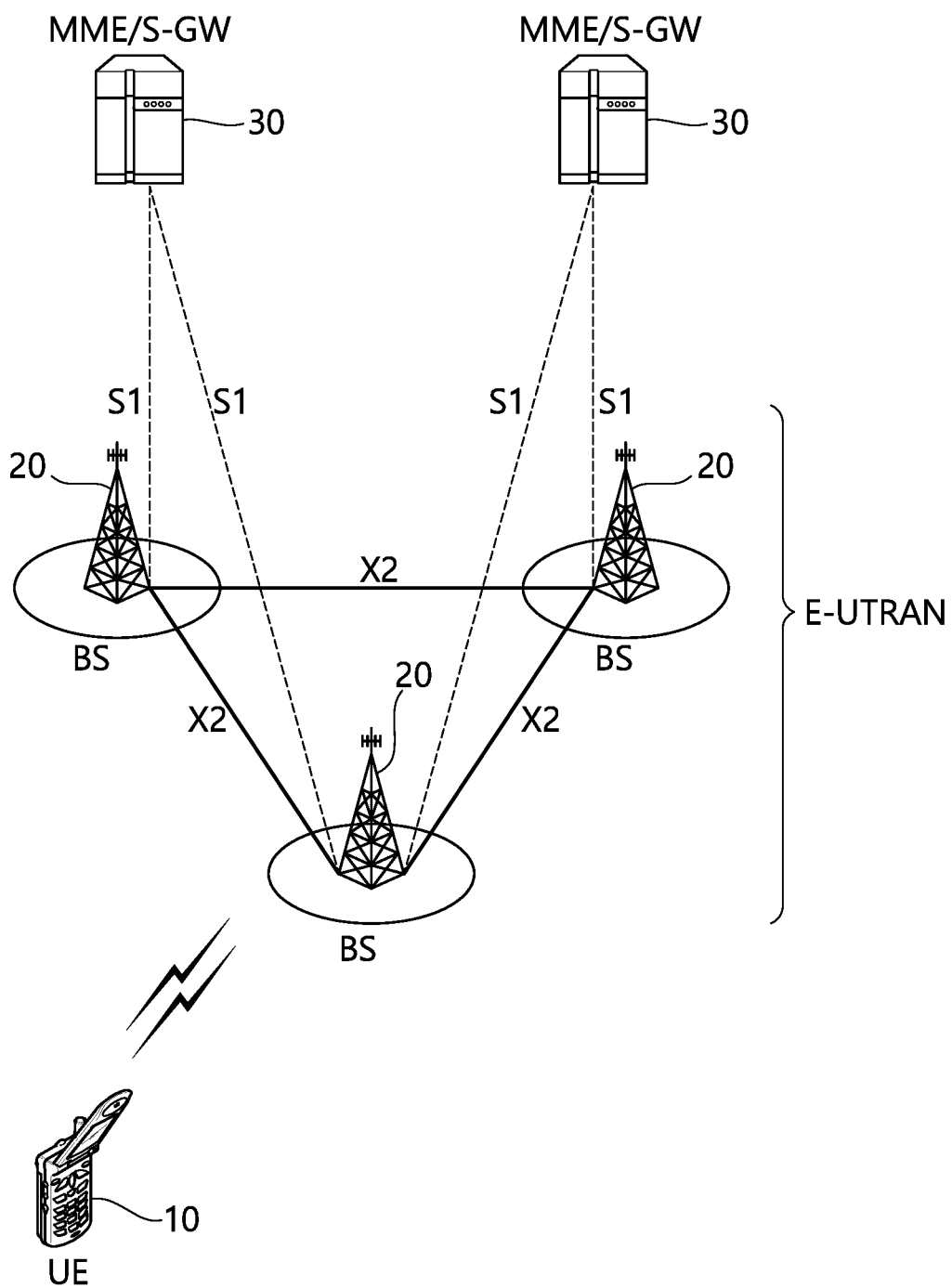
FIG. 1 shows LTE system architecture.

FIG. 1 shows LTE system architecture. The communication network is widely deployed to provide a variety of communication services such as voice over internet protocol (VoIP) through IMS and packet data.

Referring to FIG. 1, the LTE system architecture includes one or more user equipment (UE; 10), an evolved-UMTS terrestrial radio access network (E-UTRAN) and an evolved packet core (EPC). The UE (10) refers to a communication equipment carried by a user. The UE (10) may be fixed or mobile, and may be referred to as another terminology, such as a mobile station (MS), a user terminal (UT), a subscriber station (SS), a wireless device, etc.

The E-UTRAN includes one or more evolved node-B (eNB) (20), and a plurality of UEs may be located in one cell. The eNB (20) provides an end point of a control plane and a user plane to the UE (10). The eNB (20) is generally a fixed station that communicates with the UE (10) and may be referred to as another terminology, such as a base station (BS), a base transceiver system (BTS), an access point, and so on. One eNB (20) may be deployed per cell. There are one or more cells within the coverage of the eNB (20). A single cell is configured to have one of bandwidths selected from 1.25, 2.5, 5, 10, and 20 MHz, etc., and provides downlink or uplink transmission services to several UEs. In this case, different cells may be configured to provide different bandwidths.

Hereinafter, a downlink (DL) denotes communication from the eNB (20) to the UE (10), and an uplink (UL) denotes communication from the UE (10) to the eNB (20). In the DL, a transmitter may be a part of the eNB (20), and a receiver may be a part of the UE (10). In the UL, the transmitter may be a part of the UE (10), and the receiver may be a part of the eNB (20).

The EPC includes a mobility management entity (MME) which is in charge of control plane functions, and a system architecture evolution (SAE) gateway (S-GW) which is in charge of user plane functions. The MME/S-GW (30) may be positioned at the end of the network and connected to an external network. The MME has UE access information or UE capability information, and such information may be primarily used in UE mobility management. The S-GW is a gateway of which an endpoint is an E-UTRAN. The MME/S-GW (30) provides an end point of a session and mobility management function for the UE (10). The EPC may further include a packet data network (PDN) gateway (PDN-GW). The PDN-GW is a gateway of which an endpoint is a PDN.

The MME provides various functions including non-access stratum (NAS) signaling to eNBs (20), NAS signaling security, access stratum (AS) security control, Inter core network (CN) node signaling for mobility between 3GPP access networks, idle mode UE reachability (including control and execution of paging retransmission), tracking area list management (for UE in idle and active mode), P-GW and S-GW selection, MME selection for handovers with MME change, serving GPRS support node (SGSN) selection for handovers to 2G or 3G 3GPP access networks, roaming, authentication, bearer management functions including dedicated bearer establishment, support for public warning system (PWS) (which includes earthquake and tsunami warning system (ETWS) and commercial mobile alert system (CMAS)) message transmission. The S-GW host provides assorted functions including per-user based packet filtering (by e.g., deep packet inspection), lawful interception, UE Internet protocol (IP) address allocation, transport level packet marking in the DL, UL and DL service level charging, gating and rate enforcement, DL rate enforcement based on APN-AMBR. For clarity MME/S-GW 30 will be referred to herein simply as a "gateway," but it is understood that this entity includes both the MME and S-GW.

Interfaces for transmitting user traffic or control traffic may be used. The UE (10) and the eNB (20) are connected by means of a Uu interface. The eNBs (20) are interconnected by means of an X2 interface. Neighbor eNBs may have a meshed network structure that has the X2 interface. The eNBs (20) are connected to the EPC by means of an S1 interface. The eNBs (20) are connected to the MME by means of an S1-MME interface, and are connected to the S-GW by means of S1-U interface. The S1 interface supports a many-to-many relation between the eNB (20) and the MME/S-GW.

The eNB (20) may perform functions of selection for a gateway (30), routing toward the gateway (30) during a radio resource control (RRC) activation, scheduling and transmitting of paging messages, scheduling and transmitting of broadcast channel (BCH) information, dynamic allocation of resources to the UEs (10) in both UL and DL, configuration and provisioning of eNB measurements, radio bearer control, radio admission control (RAC), and connection mobility control in LTE_ACTIVE state. In the EPC, and as noted above, the gateway (30) may perform functions of paging origination, LTE_IDLE state management, ciphering of the user plane, SAE bearer control, and ciphering and integrity protection of NAS signaling.

Figure 2:
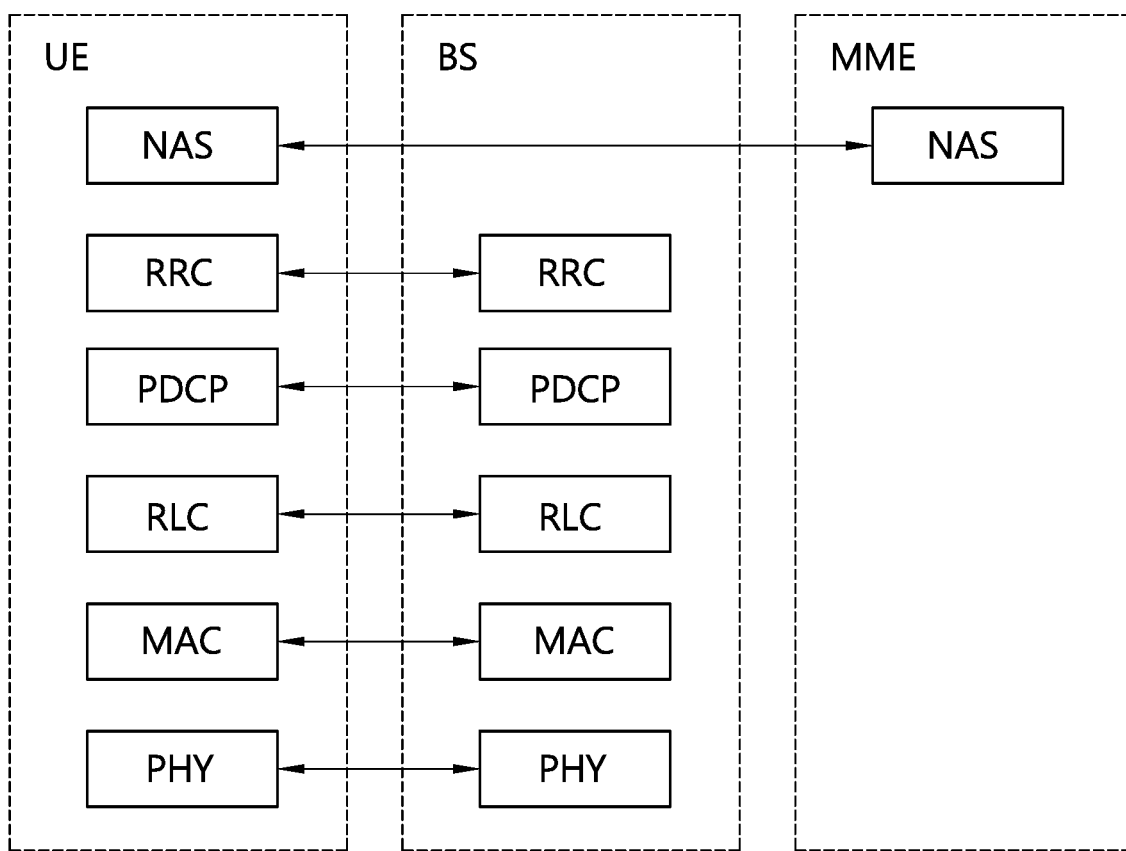
FIG. 2 shows a control plane of a radio interface protocol of an LTE system.
Figure 3:
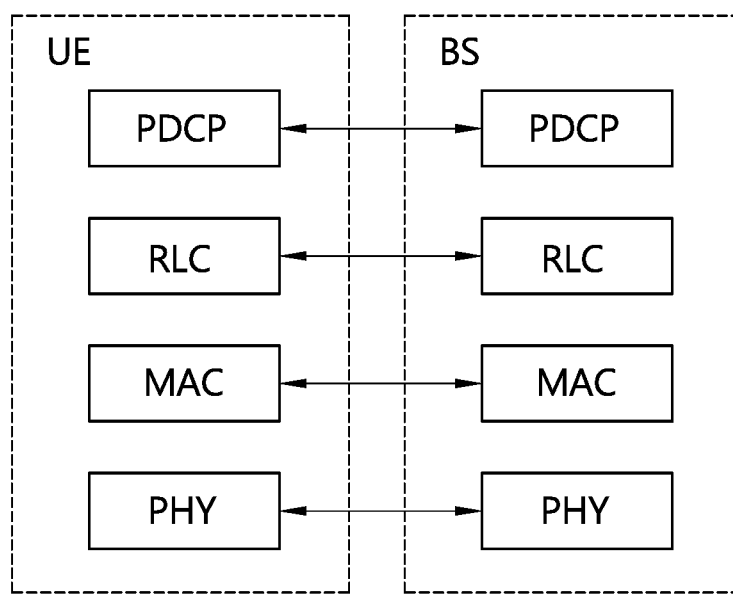
FIG. 3 shows a user plane of a radio interface protocol of an LTE system.

FIG. 2 shows a control plane of a radio interface protocol of an LTE system. FIG. 3 shows a user plane of a radio interface protocol of an LTE system.

Layers of a radio interface protocol between the UE and the E-UTRAN may be classified into a first layer (L1), a second layer (L2), and a third layer (L3) based on the lower three layers of the open system interconnection (OSI) model that is well-known in the communication system. The radio interface protocol between the UE and the E-UTRAN may be horizontally divided into a physical layer, a data link layer, and a network layer, and may be vertically divided into a control plane (C-plane) which is a protocol stack for control signal transmission and a user plane (U-plane) which is a protocol stack for data information transmission. The layers of the radio interface protocol exist in pairs at the UE and the E-UTRAN, and are in charge of data transmission of the Uu interface.

A physical (PHY) layer belongs to the L1. The PHY layer provides a higher layer with an information transfer service through a physical channel. The PHY layer is connected to a medium access control (MAC) layer, which is a higher layer of the PHY layer, through a transport channel A physical channel is mapped to the transport channel. Data is transferred between the MAC layer and the PHY layer through the transport channel. Between different PHY layers, i.e., a PHY layer of a transmitter and a PHY layer of a receiver, data is transferred through the physical channel using radio resources. The physical channel is modulated using an orthogonal frequency division multiplexing (OFDM) scheme, and utilizes time and frequency as a radio resource.

The PHY layer uses several physical control channels. A physical downlink control channel (PDCCH) reports to a UE about resource allocation of a paging channel (PCH) and a downlink shared channel (DL-SCH), and hybrid automatic repeat request (HARQ) information related to the DL-SCH. The PDCCH may carry a UL grant for reporting to the UE about resource allocation of UL transmission. A physical control format indicator channel (PCFICH) reports the number of OFDM symbols used for PDCCHs to the UE, and is transmitted in every subframe. A physical hybrid ARQ indicator channel (PHICH) carries an HARQ acknowledgement (ACK)/non-acknowledgement (NACK) signal in response to UL transmission. A physical uplink control channel (PUCCH) carries UL control information such as HARQ ACK/NACK for DL transmission, scheduling request, and CQI. A physical uplink shared channel (PUSCH) carries a UL-uplink shared channel (SCH).

A physical channel consists of a plurality of subframes in time domain and a plurality of subcarriers in frequency domain. One subframe consists of a plurality of symbols in the time domain. One subframe consists of a plurality of resource blocks (RBs). One RB consists of a plurality of symbols and a plurality of subcarriers. In addition, each subframe may use specific subcarriers of specific symbols of a corresponding subframe for a PDCCH. For example, a first symbol of the subframe may be used for the PDCCH. The PDCCH carries dynamic allocated resources, such as a physical resource block (PRB) and modulation and coding scheme (MCS). A transmission time interval (TTI) which is a unit time for data transmission may be equal to a length of one subframe. The length of one subframe may be 1 ms.

The transport channel is classified into a common transport channel and a dedicated transport channel according to whether the channel is shared or not. A DL transport channel for transmitting data from the network to the UE includes a broadcast channel (BCH) for transmitting system information, a paging channel (PCH) for transmitting a paging message, a DL-SCH for transmitting user traffic or control signals, and so on. The DL-SCH supports HARQ, dynamic link adaptation by varying the modulation, coding and transmit power, and both dynamic and semi-static resource allocation. The DL-SCH also may enable broadcast in the entire cell and the use of beamforming. The system information carries one or more system information blocks. All system information blocks may be transmitted with the same periodicity. Traffic or control signals of a multimedia broadcast/multicast service (MBMS) may be transmitted through the DL-SCH or a multicast channel (MCH).

A UL transport channel for transmitting data from the UE to the network includes a random access channel (RACH) for transmitting an initial control message, a UL-SCH for transmitting user traffic or control signals, and so on. The UL-SCH supports HARQ and dynamic link adaptation by varying the transmit power and potentially modulation and coding. The UL-SCH also may enable the use of beamforming. The RACH is normally used for initial access to a cell.

A MAC layer belongs to the L2. The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. A MAC sublayer provides data transfer services on logical channels.

The logical channels are classified into control channels for transferring control plane information and traffic channels for transferring user plane information, according to a type of transmitted information. That is, a set of logical channel types is defined for different data transfer services offered by the MAC layer. The logical channels are located above the transport channel, and are mapped to the transport channels.

The control channels are used for transfer of control plane information only. The control channels provided by the MAC layer include a broadcast control channel (BCCH), a paging control channel (PCCH), a common control channel (CCCH), a multicast control channel (MCCH) and a dedicated control channel (DCCH). The BCCH is a downlink channel for broadcasting system control information. The PCCH is a downlink channel that transfers paging information and is used when the network does not know the location cell of a UE. The CCCH is used by UEs having no RRC connection with the network. The MCCH is a point-to-multipoint downlink channel used for transmitting MBMS control information from the network to a UE. The DCCH is a point-to-point bi-directional channel used by UEs having an RRC connection that transmits dedicated control information between a UE and the network.

Traffic channels are used for the transfer of user plane information only. The traffic channels provided by the MAC layer include a dedicated traffic channel (DTCH) and a multicast traffic channel (MTCH). The DTCH is a point-to-point channel, dedicated to one UE for the transfer of user information and may exist in both uplink and downlink. The MTCH is a point-to-multipoint downlink channel for transmitting traffic data from the network to the UE.

Uplink connections between logical channels and transport channels include the DCCH that may be mapped to the UL-SCH, the DTCH that may be mapped to the UL-SCH and the CCCH that may be mapped to the UL-SCH. Downlink connections between logical channels and transport channels include the BCCH that may be mapped to the BCH or DL-SCH, the PCCH that may be mapped to the PCH, the DCCH that may be mapped to the DL-SCH, and the DTCH that may be mapped to the DL-SCH, the MCCH that may be mapped to the MCH, and the MTCH that may be mapped to the MCH.

An RLC layer belongs to the L2. The RLC layer provides a function of adjusting a size of data, so as to be suitable for a lower layer to transmit the data, by concatenating and segmenting the data received from an upper layer in a radio section. In addition, to ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides a retransmission function through an automatic repeat request (ARQ) for reliable data transmission. Meanwhile, a function of the RLC layer may be implemented with a functional block inside the MAC layer. In this case, the RLC layer may not exist.

A packet data convergence protocol (PDCP) layer belongs to the L2. The PDCP layer provides a function of header compression function that reduces unnecessary control information such that data being transmitted by employing IP packets, such as IPv4 or IPv6, may be efficiently transmitted over a radio interface that has a relatively small bandwidth. The header compression increases transmission efficiency in the radio section by transmitting only necessary information in a header of the data. In addition, the PDCP layer provides a function of security. The function of security includes ciphering which prevents inspection of third parties, and integrity protection which prevents data manipulation of third parties.

A radio resource control (RRC) layer belongs to the L3. The RLC layer is located at the lowest portion of the L3, and is only defined in the control plane. The RRC layer takes a role of controlling a radio resource between the UE and the network. For this, the UE and the network exchange an RRC message through the RRC layer. The RRC layer controls logical channels, transport channels, and physical channels in relation to the configuration, reconfiguration, and release of RBs. An RB is a logical path provided by the L1 and L2 for data delivery between the UE and the network. That is, the RB signifies a service provided the L2 for data transmission between the UE and E-UTRAN. The configuration of the RB implies a process for specifying a radio protocol layer and channel properties to provide a particular service and for determining respective detailed parameters and operations. The RB is classified into two types, i.e., a signaling RB (SRB) and a data RB (DRB). The SRB is used as a path for transmitting an RRC message in the control plane. The DRB is used as a path for transmitting user data in the user plane.

A Non-Access Stratum (NAS) layer placed over the RRC layer performs functions, such as session management and mobility management.

Referring to FIG. 2, the RLC and MAC layers (terminated in the eNB on the network side) may perform functions such as scheduling, automatic repeat request (ARQ), and hybrid automatic repeat request (HARQ). The RRC layer (terminated in the eNB on the network side) may perform functions such as broadcasting, paging, RRC connection management, RB control, mobility functions, and UE measurement reporting and controlling. The NAS control protocol (terminated in the MME of gateway on the network side) may perform functions such as a SAE bearer management, authentication, LTE_IDLE mobility handling, paging origination in LTE_IDLE, and security control for the signaling between the gateway and UE.

Referring to FIG. 3, the RLC and MAC layers (terminated in the eNB on the network side) may perform the same functions for the control plane. The PDCP layer (terminated in the eNB on the network side) may perform the user plane functions such as header compression, integrity protection, and ciphering.

Hereinafter, an RRC State of a UE and RRC Connection Procedure are Described.

An RRC state indicates whether an RRC layer of the UE is logically connected to an RRC layer of the E-UTRAN. The RRC state may be divided into two different states such as an RRC_connected state and an RRC idle state. When an RRC connection is established between the RRC layer of the UE and the RRC layer of the E-UTRAN, the UE is in RRC_CONNECTED, and otherwise the UE is in RRC_IDLE. Since the UE in RRC_CONNECTED has the RRC connection established with the E-UTRAN, the E-UTRAN may recognize the existence of the UE in RRC_CONNECTED and may effectively control the UE. Meanwhile, the UE in RRC_IDLE may not be recognized by the E-UTRAN, and a CN manages the UE in unit of a TA which is a larger area than a cell. That is, only the existence of the UE in RRC_IDLE is recognized in unit of a large area, and the UE must transition to RRC_CONNECTED to receive a typical mobile communication service such as voice or data communication.

In RRC_IDLE state, the UE may receive broadcasts of system information and paging information while the UE specifies a discontinuous reception (DRX) configured by NAS, and the UE has been allocated an identification (ID) which uniquely identifies the UE in a tracking area and may perform public land mobile network (PLMN) selection and cell re-selection. Also, in RRC_IDLE state, no RRC context is stored in the eNB.

In RRC_CONNECTED state, the UE has an E-UTRAN RRC connection and a context in the E-UTRAN, such that transmitting and/or receiving data to/from the eNB becomes possible. Also, the UE may report channel quality information and feedback information to the eNB. In RRC_CONNECTED state, the E-UTRAN knows the cell to which the UE belongs. Therefore, the network may transmit and/or receive data to/from UE, the network may control mobility (handover and inter-radio access technologies (RAT) cell change order to GSM EDGE radio access network (GERAN) with network assisted cell change (NACC)) of the UE, and the network may perform cell measurements for a neighbor cell.

In RRC_IDLE state, the UE specifies the paging DRX cycle. Specifically, the UE monitors a paging signal at a specific paging occasion of every UE specific paging DRX cycle. The paging occasion is a time interval during which a paging signal is transmitted. The UE has its own paging occasion.

A paging message is transmitted over all cells belonging to the same tracking area. If the UE moves from one TA to another TA, the UE will send a tracking area update (TAU) message to the network to update its location.

When the user initially powers on the UE, the UE first searches for a proper cell and then remains in RRC_IDLE in the cell. When there is a need to establish an RRC connection, the UE which remains in RRC_IDLE establishes the RRC connection with the RRC of the E-UTRAN through an RRC connection procedure and then may transition to RRC_CONNECTED. The UE which remains in RRC_IDLE may need to establish the RRC connection with the E-UTRAN when uplink data transmission is necessary due to a user's call attempt or the like or when there is a need to transmit a response message upon receiving a paging message from the E-UTRAN.

To manage mobility of the UE in the NAS layer, two states are defined, i.e., an EPS mobility management-REGISTERED (EMM-REGISTERED) state and an EMM-DEREGISTERED state. These two states apply to the UE and the MME. Initially, the UE is in the EMM-DEREGISTERED state. To access a network, the UE performs a process of registering to the network through an initial attach procedure. If the attach procedure is successfully performed, the UE and the MME enter the EMM-REGISTERED state.

To manage a signaling connection between the UE and the EPC, two states are defined, i.e., an EPS connection management (ECM)-IDLE state and an ECM-CONNECTED state. These two states apply to the UE and the MME. When the UE in the ECM-IDLE state establishes an RRC connection with the E-UTRAN, the UE enters the ECM-CONNECTED state. When the MME in the ECM-IDLE state establishes an S1 connection with the E-UTRAN, the MME enters the ECM-CONNECTED state. When the UE is in the ECM-IDLE state, the E-UTRAN does not have context information of the UE. Therefore, the UE in the ECM-IDLE state performs a UE-based mobility related procedure such as cell selection or reselection without having to receive a command of the network. On the other hand, when the UE is in the ECM-CONNECTED state, mobility of the UE is managed by the command of the network. If a location of the UE in the ECM-IDLE state becomes different from a location known to the network, the UE reports the location of the UE to the network through a tracking area update procedure.

Hereinafter, a 5G Network Structure is Described.

Figure 4:
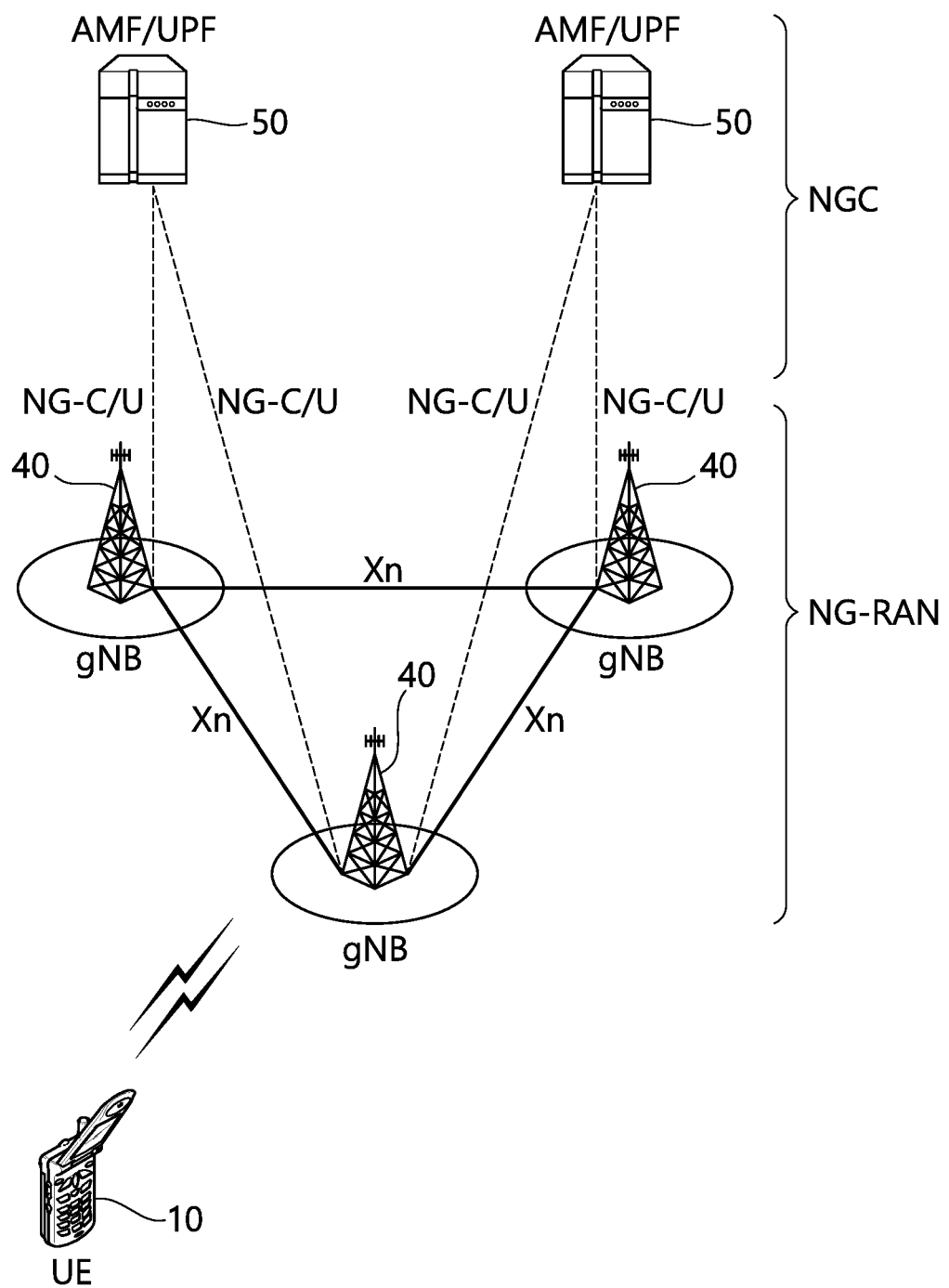
FIG. 4 shows a structure of a 5G system.

FIG. 4 shows a structure of a 5G system.

In case of an evolved packet core (EPC) having a core network structure of the existing evolved packet system (EPS), a function, a reference point, a protocol, or the like is defined for each entity such as a mobility management entity (MME), a serving gateway (S-GW), a packet data network gateway (P-GW), or the like.

On the other hand, in case of a 5G core network (or a NextGen core network), a function, a reference point, a protocol, or the like is defined for each network function (NF). That is, in the 5G core network, the function, the reference point, the protocol, or the like is not defined for each entity.

Referring to FIG. 4, the 5G system structure includes at least one UE (10), a next generation-radio access network (NG-RAN), and a next generation core (NGC).

The NG-RAN may include at least one gNB (40), and a plurality of UEs may be present in one cell. The gNB (40) provides the UE with end points of the control plane and the user plane. The gNB (40) is generally a fixed station that communicates with the UE (10) and may be referred to as another terminology, such as a base station (BS), a base transceiver system (BTS), an access point, or the like. One gNB (40) may be arranged in every cell. At least one cell may be present in a coverage of the gNB (40).

The NGC may include an access and mobility function (AMF) and a session management function (SMF) which are responsible for a function of a control plane. The AMF may be responsible for a mobility management function, and the SMF may be responsible for a session management function. The NGC may include a user plane function (UPF) which is responsible for a function of a user plane.

Interfaces for transmitting user traffic or control traffic may be used. The UE (10) and the gNB (40) may be connected by means of a Uu interface. The gNBs (40) may be interconnected by means of an X2 interface. Neighboring gNBs (40) may have a meshed network structure based on an Xn interface. The gNBs (40) may be connected to an NGC by means of an NG interface. The gNBs (40) may be connected to an AMF by means of an NGC interface, and may be connected to a UPF by means of an NG-U interface. The NG interface supports a many-to-many-relation between the gNB (40) and the AMF/UPF (50).

A gNB host may perform functions such as functions for radio resource management, IP header compression and encryption of user data stream, selection of an AMF at UE attachment when no routing to an AMF can be determined from the information provided by the UE, routing of user plane data towards UPF(s), scheduling and transmission of paging messages (originated from the AMF), scheduling and transmission of system broadcast information (originated from the AMF or O&M), or measurement and measurement reporting configuration for mobility and scheduling.

An access and mobility function (AMF) host may perform primary functions such as NAS signaling termination, NAS signaling security, AS security control, inter CN node signaling for mobility between 3GPP access networks, idle mode UE reachability (including control and execution of paging retransmission), tracking area list management (for UE in idle and active mode), AMF selection for handovers with AMF change, access authentication, or access authorization including check of roaming rights.

A user plane function (UPF) host may perform primary functions such as anchor point for Intra-/inter-RAT mobility (when applicable), external PDU session point of interconnect to data network, packet routing & forwarding, packet inspection and user plane part of policy rule enforcement, traffic usage reporting, uplink classifier to support routing traffic flows to a data network, branching point to support multi-homed PDU session, QoS handling for user plane, e.g. packet filtering, gating, UL/DL rate enforcement, uplink traffic verification (SDF to QoS flow mapping), transport level packet marking in the uplink and downlink, or downlink packet buffering and downlink data notification triggering.

A session management function (SMF) host may perform primary functions such as session management, UE IP address allocation and management, selection and control of UP function, configuring traffic steering at UPF to route traffic to proper destination, controlling part of policy enforcement and QoS, or downlink data notification.

Hereinafter, a D2D Operation Will be Described.

In the 3GPP LTE-A, a service related to the D2D operation refers to Proximity based Services (ProSe). Hereinafter, the ProSe is an equivalent concept with the D2D operation and the ProSe may be compatibly used with the D2D operation. The ProSe is now described. The ProSe includes ProSe direct communication and ProSe direct discovery.

The ProSe direct communication presents communication performed by two or more adjacent UEs. The UEs may perform communication using a protocol of a user plane. A ProSe-enabled UE means a UE for supporting a process related to requirements of the ProSe. Unless otherwise defined, the ProSe-enabled UE includes both of a public safety UE and a non-public safety UE. The public safety UE represents a UE for supporting both of a public safety specified function and the ProSe process. The non-public safety UE is a UE which supports the ProSe process but does not support the public safety specified function.

The ProSe direct discovery is a process where the ProSe-enabled UE discovers another ProSe-enabled UE. In this case, only ability of the two ProSe-enabled UEs is used. An EPC-level ProSe discovery signifies a process where an EPC determines whether 2 ProSe enable UEs are closed to each other, and reports the close state thereof the two ProSe enabled UEs. Hereinafter, the ProSe direct communication may refer to D2D communication, and the ProSe direct discovery may refer to D2D discovery.

Hereinafter, Radio Resource Assignment for ProSe Direct Communication Will be Described.

ProSe-enabled UE may use the following two types of mode for resource assignment for ProSe direct communication.

1) Mode 1: Mode 1 is mode in which resources for ProSe direct communication are scheduled by a base station. UE needs to be in the RRC_CONNECTED state in order to send data in accordance with mode 1. The UE requests a transmission resource from the base station. The base station performs scheduling assignment and schedules resources for sending data. The UE may send a scheduling request to the base station and send a ProSe Buffer Status Report (BSR). The base station has data to be subjected to ProSe direct communication by the UE on the basis of the ProSe BSR and determines that a resource for transmission is required.

2) Mode 2: Mode 2 is mode in which UE directly selects a resource. UE directly selects a resource for ProSe direct communication in a resource pool. The resource pool may be configured by a network or may have been previously determined.

Meanwhile, if UE has a serving cell, that is, if the UE is in the RRC_CONNECTED state with a base station or is placed in a specific cell in the RRC_IDLE state, the UE is considered to be placed within coverage of the base station. If UE is placed outside coverage, only mode 2 may be applied. If the UE is placed within the coverage, the UE may use mode 1 or mode 2 depending on the configuration of the base station. If another exception condition is not present, only when a base station performs a configuration, UE may change mode from mode 1 to mode 2 or from mode 2 to mode 1.

Figure 5:
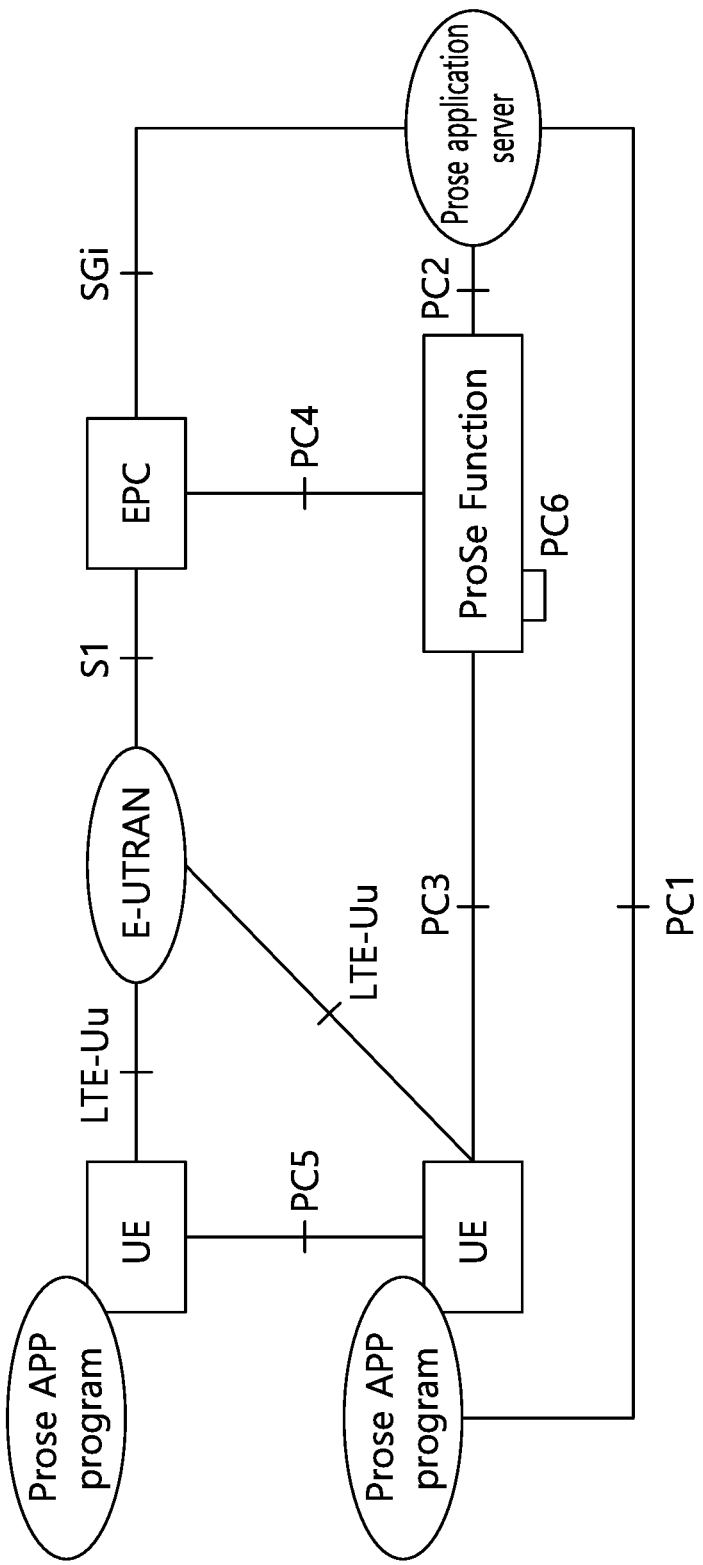
FIG. 5 shows a reference structure for a ProSe.

FIG. 5 shows a reference structure for a ProSe.

Referring to FIG. 5, the reference structure for a ProSe includes a plurality of UEs having E-UTRAN, EPC, and ProSe application program, a ProSe application (APP) server, and a ProSe function. An EPC is a representative example of the E-UTRAN. The EPC may include an MME, an S-GW, a P-GW, a policy and charging rules function (PCRF), and a home subscriber server (HSS). The ProSe application server is a user of ProSe in order to make an application function. The ProSe application server may communicate with an application program in the UE. The application program in the UE may use a ProSe ability to make an application function.

The ProSe function may include at least one of following functions but is not limited thereto.

Interworking via a reference point towards the 3rd party applications

Authorization and configuration of the UE for discovery and direct communication)

Enable the function of the EPC level ProSe discovery

ProSe related new subscriber data and handling of data storage, and also handling of ProSe identities Security related function Provide control towards the EPC for policy related function Provide function for charging (via or outside of EPC, e.g., offline charging))

Hereinafter, a Reference Point and a Reference Interface Will be Described in a Reference Structure for the ProSe.

PC1: a reference point between a ProSe application program in the UE and a ProSe application program in a ProSe application server. The PC1 is used to define signaling requirements in an application level.

PC2: is a reference point between the ProSe application server and a ProSe function. The PC2 is used to define an interaction between the ProSe application server and a ProSe function. An application data update of a ProSe database of the ProSe function may be an example of the interaction.

PC3: is a reference point between the UE and the ProSe function. The PC3 is used to define an interaction between the UE and the ProSe function. Configuration for ProSe discovery and communication may be an example of the interaction.

PC4: is a reference point between an EPC and the ProSe function. The PC4 is used to define an interaction between the EPC and the ProSe function. The interaction lay illustrate when a path for 1:1 communication or a ProSe service for real time session management or mobility management are authorized.

PC5: is a reference point to use control/user plane for discovery, communication, and relay between UEs, and 1:1 communication.

PC6: is a reference point to use a function such as ProSe discovery between users included in different PLMNs.

SGi: may be used for application data and application level control information exchange.

Hereinafter, Vehicle to Everything (V2X) Communication is Described.

Figure 6:
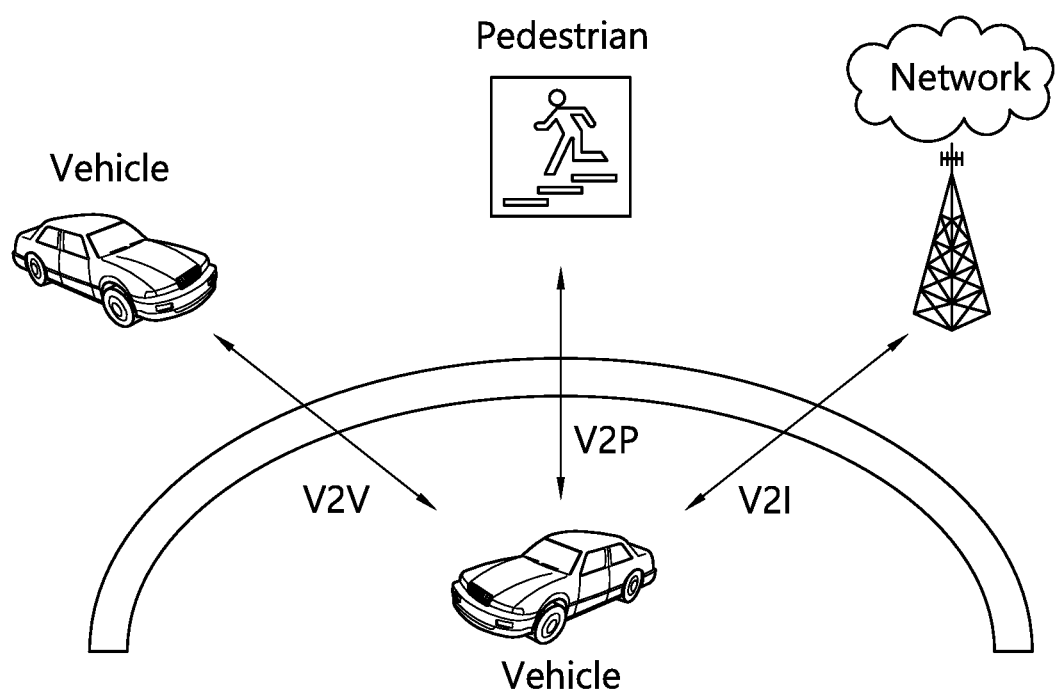
FIG. 6 is a diagram illustrating a V2X communication environment.

FIG. 6 is a diagram illustrating a V2X communication environment.

V2X is a technology that continuously communicates with a road infra or another vehicle while running a vehicle by adding mobility to D2D technology to exchange and share valuable information such as traffic situation. Researches and studies for supporting Vehicle-to-Vehicle (V2V) communication, Vehicle-to-Infrastructure (V2I) communication, Vehicle-to-Pedestrian (V2P) communication, Vehicle-to-Network (V2N) communication through evolution of connectivity function has been performed.

According to V2X communication, a vehicle continuously broadcasts a position, speed, and a direction of the vehicle. Peripheral vehicles receiving the broadcasted information recognize movement of peripheral vehicles to use accident prevention. That is, similar to a case where a person has a UE in the form of a smart phone or a smart watch, a UE of a specific form may be installed in each vehicle. In this case, a UE installed at a vehicle is a device for receiving a real communication service from a communication network. For example, the UE installed at the vehicle may access a base station in an E-UTRAN to receive a communication service.

Figure 7:
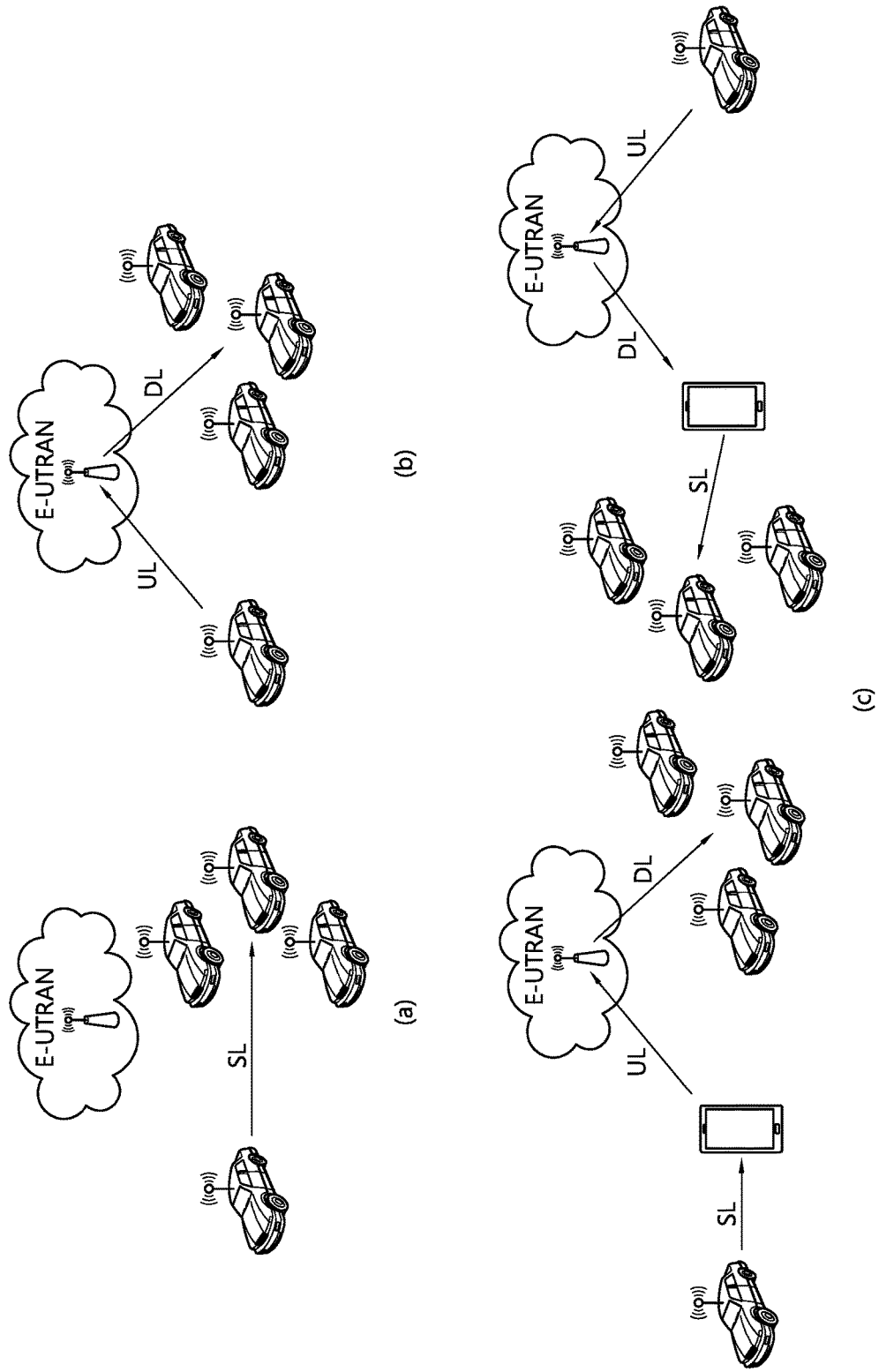
FIG. 7 shows a scenario considered for V2X.

FIG. 7 shows a scenario considered for V2X.

Referring to FIG. 7(a), a scenario supporting only the PC5-based V2X service, which corresponds to an interface only between UEs, may be considered for the V2X. Referring to FIG. 7(b), a scenario supporting only the Uu-based V2X service, which corresponds to an interface only between a base station and a UE, may be considered for the V2X. Referring to FIG. 7(c), a scenario supporting both the PC5-based V2X service and the Uu-based V2X service may be considered for the V2X. The base station may switch the bearer from Uu to PC5. More specifically, the base station may switch the Uu-based V2X service to the PC5-based V2X service.

Meanwhile, if the load of a Uu interface is high, or if the Uu interface is overloaded, and in case the base station is capable of knowing which bearer is to be used for the V2X service, when needed, the base station may trigger a release of a related bearer, and, accordingly, a larger amount of PC5 resources may be provided to the UE. For example, by receiving an indicator indicating a V2X bearer, the base station is capable of knowing which bearer is being used for the V2X service. However, in case of a release of a bearer that is triggered by the base station, the following problems may occur.

In case the base station wishes (or wants) to release the bearer for the V2X service, an MME Initiated Dedicated Bearer Deactivation procedure may be used. In this specification, the bearer for the V2X service may indicate a bearer that is used for the V2X service or a bearer that is to be used for the V2X service. And, for simplicity, this will be referred to as a V2X bearer. The procedure for deactivating dedicated bearer that is initiated by the MME is described in detail in 3GPP TS 23.401 V13.6.1 (2016-03) Section 5.4.4.2 MME Initiated Dedicated Bearer Deactivation.

Figure 8:
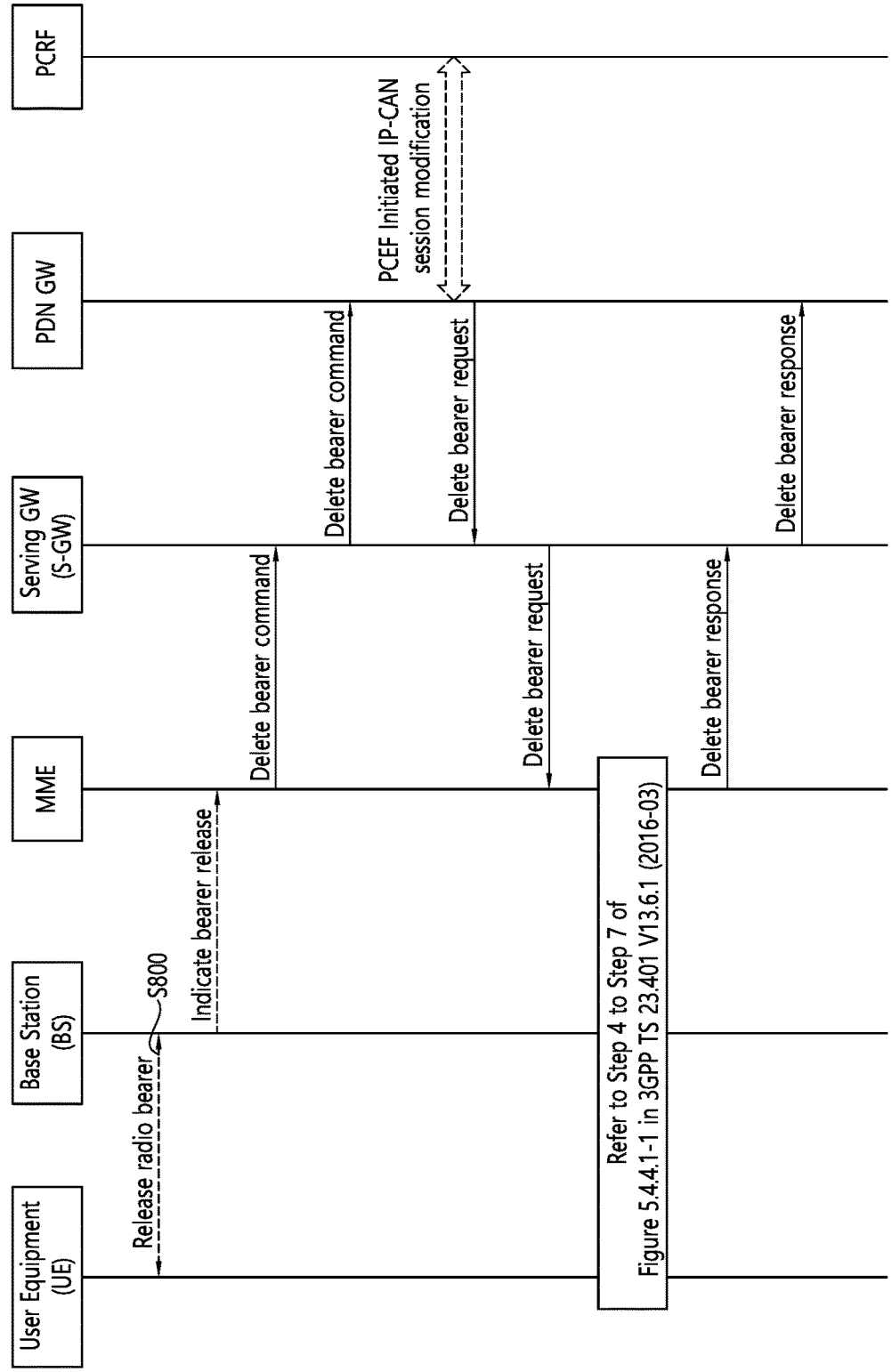
FIG. 8 shows an MME initiated dedicated bearer deactivation procedure.

FIG. 8 shows an MME initiated dedicated bearer deactivation procedure.

Referring to FIG. 8, in step S800, a radio bearer for a UE being in an ECM_CONNECTED state may be released due to local reasons (e.g., abnormal resource limitation or a wireless condition that does not allow (or authorize) the base station to maintain all of the allocated GBR bearers). However, as long as an error situation does not occur, a non-GBR bearer is not released by the base station. QCI characteristics of the GBR bearer and the non-GBR bearer may be indicated as shown below in Table 1.

TABLE 1

| QCI | Resource Type | Priority Level | Packet Delay Budget | Packet Error Loss Rate | Example Services |
|---|---|---|---|---|---|
| 75 | GBR | 1.8 | 50 ms | 10-2 | V2X messages |
| 79 | Non-GBR | 5.8 | 50 ms | 10-2 | V2X messages |

More specifically, with the exception for the error situations of the base station, the base station does not release the non-GBR bearer. Meanwhile, a bearer that is being used for the V2X service generally corresponds to a non-GBR bearer that delivers a CAM message. Therefore, according to the MME initiated dedicated bearer deactivation procedure, even though the base station knows which bearer is being used for the V2X service, in case the load of the Uu interface is high or the Uu interface is overloaded, the base station may not trigger the release of the V2X bearer. In the MME initiated dedicated bearer deactivation procedure, this is because the base station can trigger the release of a non-GBR bearer only in an error situation.

Even if the release of the V2X bearer by the base station is authorized by using the MME initiated dedicated bearer deactivation procedure, a signaling impact may exist in the core network in case the V2X bearer is generated or released.

Figure 9:
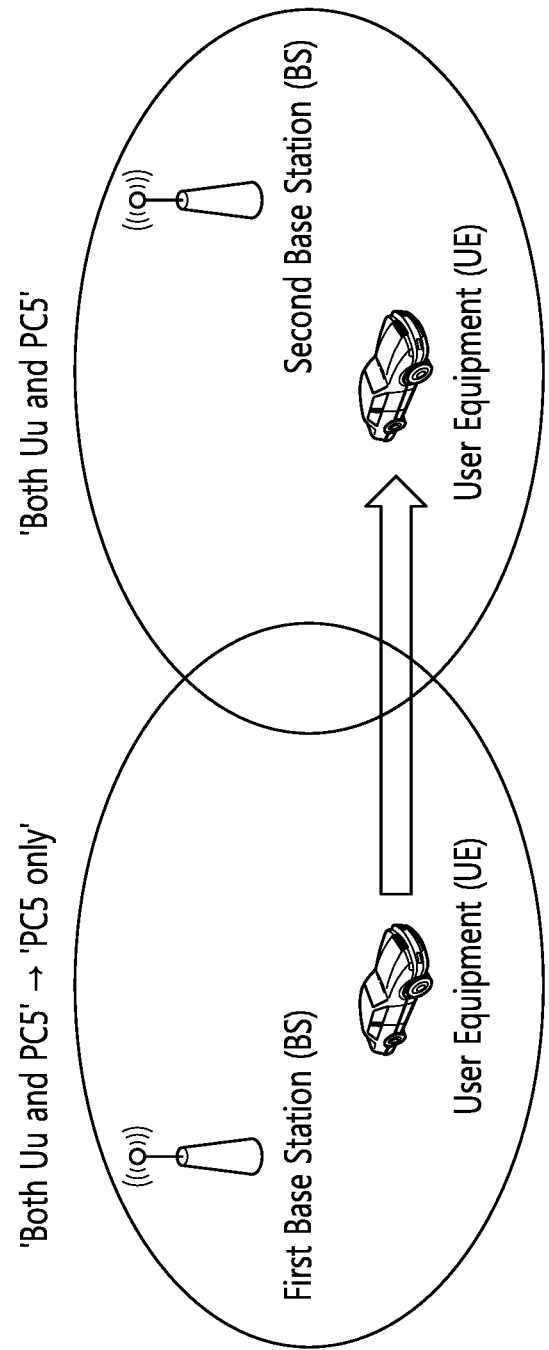
FIG. 9 is a diagram for describing a signaling impact that can be generated in a core network, in a case where a base station authorizes a release of a V2X bearer.

FIG. 9 is a diagram for describing a signaling impact that can be generated in a core network, in a case where a base station authorizes a release of a V2X bearer.

The user equipment assumes that a V2X message can be transmitted through a Uu interface. The base station may have any one of the configurations of 'Uu only', 'PC5 only', and 'both Uu and PC5' for the V2X transmission. 'Uu only' corresponds to a configuration according to which the base station supports only the Uu-based V2X service, and 'PC5 only' corresponds to a configuration according to which the base station only supports the PC5-based V2X service, and 'both Uu and PC5' corresponds to a configuration according to which the base station supports not only the Uu-based V2X service but also the PC5-based V2X service.

Referring to FIG. 9, the configuration for the V2X transmission of a first base station may be changed (or shifted) from the 'both Uu and PC5' to the 'PC5 only'. Accordingly, the first base station may release the V2X bearer of the UE by using the MME initiated dedicated bearer deactivation procedure. However, in case multiple UEs transmitting a V2X message through the Uu interface exist within a coverage of the first base station, signaling between networks for releasing the V2X bearer may increase abruptly in accordance with the number of UEs.

Furthermore, the signaling impact may also be generated in a case where the base station newly generates the V2X bearer.

Referring to FIG. 9, the UE may move to a second base station, and the configuration for the V2X transmission of the second base station may be 'both Uu and PC5'. Accordingly, the UE may request the network to generate a V2X bearer that delivers a V2X message through the Uu interface. For this, the UE may initiate a UE requested bearer resource modification procedure. The procedure for modifying bearer resource that is initiated by the UE is described in detail in 3GPP TS 23.401 V13.6.1 (2016-03) Section 5.4.5 UE requested bearer resource modification.

Figure 10:
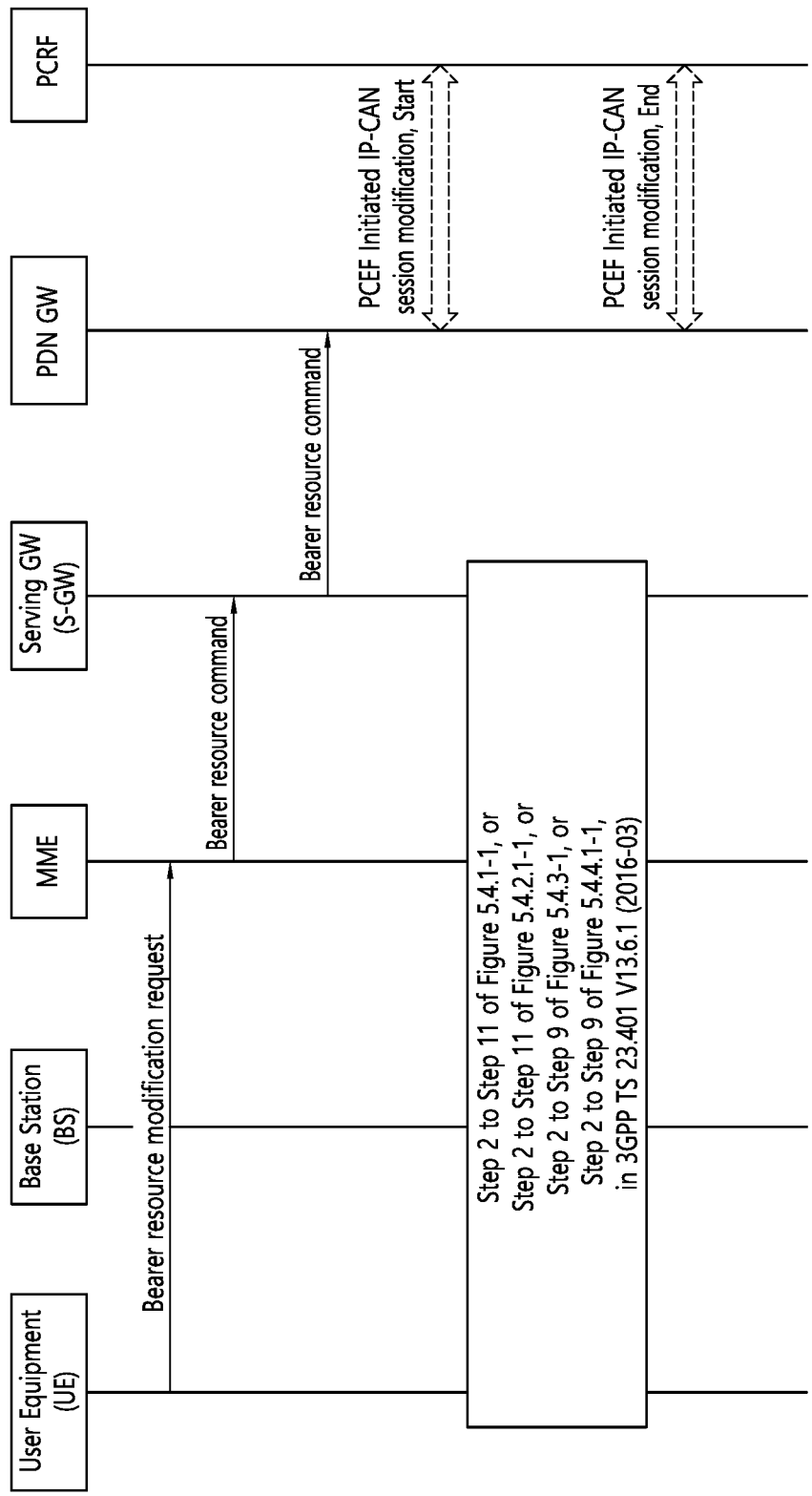
FIG. 10 shows a UE requested bearer resource modification procedure.

FIG. 10 shows a UE requested bearer resource modification procedure.

Referring to FIG. 10, in order to enable the UE to generate a V2X bearer, a large amount of signaling may be required between network entities. If the number of UEs moving from the first base station to the second base station increases, due to such increase, a larger amount of signaling may be required in the core network.

Therefore, according to the configurations for the V2X transmission of the base station, the release or set up of a specific V2X bearer by the base station may impose a signaling burden between networks.

Meanwhile, in case the load of the Uu interface is high, or in case the Uu interface is overloaded, the base station may broadcast that the configuration for the V2X transmission is set to 'PC5 only'. Since a UE that has received the 'PC5 only' configuration knows that the V2X message cannot be transmitted through the Uu interface, the base station does not transmit the V2X message by using the V2X bearer. In this situation, since traffic is not transmitted through the V2X bearer, the non-release of the V2X bearer may not cause any problem. A bearer (i.e., V2X bearer) being generated for the transmission of a V2X service (e.g., CAM message) may always be used while the UE is located in a network supporting V2X services. Therefore, while the UE is located in a network supporting V2X services, the V2X bearer does not need to be released. This is because the release of the V2X bearer may become the cause for the generation of signaling overhead. Hereinafter, according to an exemplary embodiment of the present invention, a method for maintaining the V2X bearer and a device for supporting the same will be described in detail.

Figure 11:
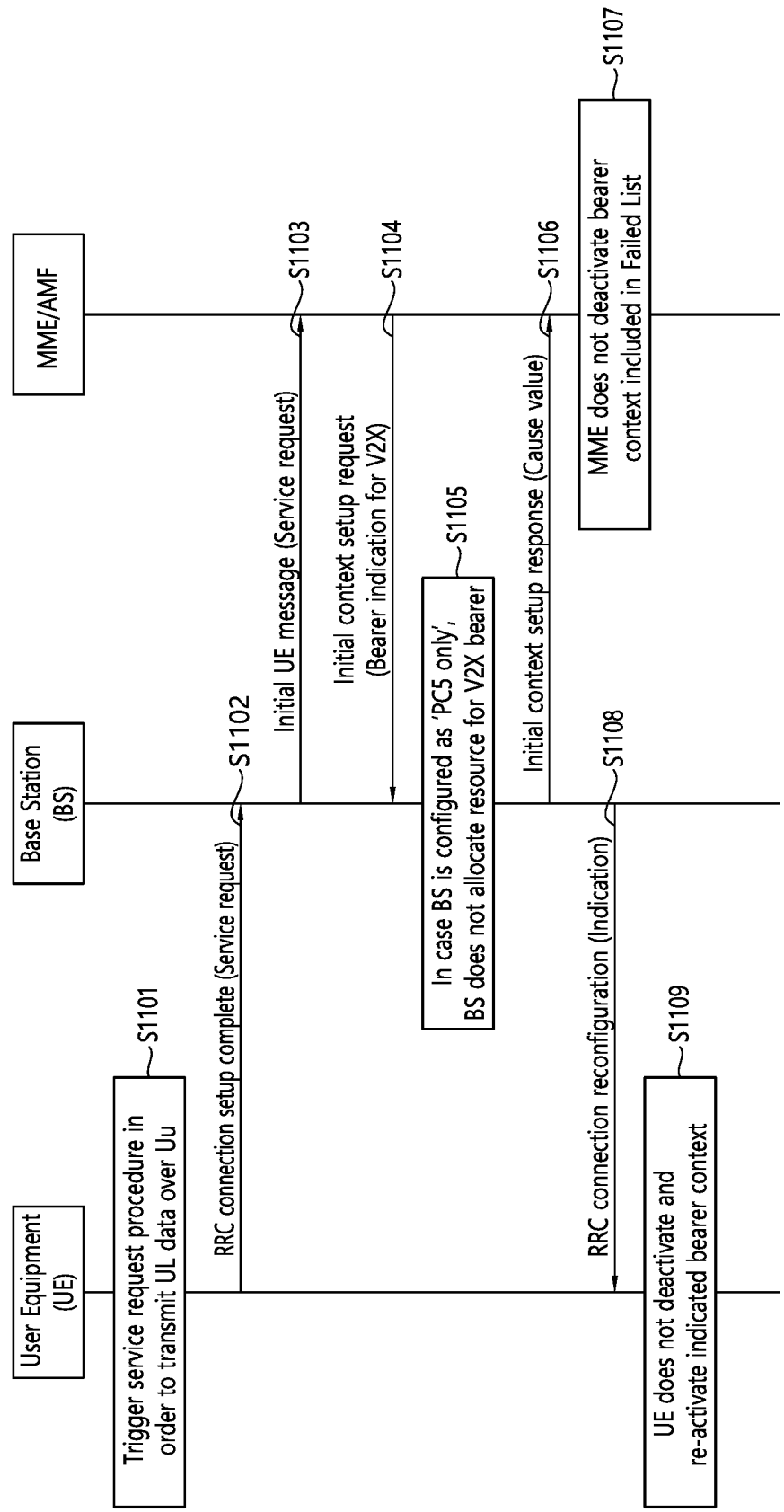
FIG. 11 shows a service request procedure for performing switching between a PC5-based V2X service and a Uu-based V2X service according to an exemplary embodiment of the present invention.

FIG. 11 shows a service request procedure for performing switching between a PC5-based V2X service and a Uu-based V2X service according to an exemplary embodiment of the present invention.

Referring to FIG. 11, in step S1101, the UE may trigger a Service Request procedure for transmitting uplink data over the Uu. The UE may be a V2X capable UE.

In step S1102, the UE may transmit a NAS message Service Request, which is capsulated in an RRC connection setup complete message, to the base station.

In step S1103, the base station may transmit the NAS message Service Request, which includes an Initial UE Message, to an MME/AMF.

In step S1104, when the MME/AMF receives the message, the MME/AMF may transmit an Initial Context Setup Request message to the base station. The Initial Context Setup Request message may include a bearer indication for V2X. The bearer indication for V2X may indicate whether or not the requested bearer is the V2X bearer. In this specification, the bearer indication for V2X may also be referred to as a V2X bearer indication.

In step S1105, the base station may determine which one of 'Uu only', 'PC5 only', and 'both Uu and PC5' is configured in the base station for the V2X transmission. When the base station is configured as 'PC5 only' and receives an initial context setup request message including a V2X bearer indication corresponding to the requested bearer, the base station may store the V2X bearer indication corresponding to each V2X bearer and may not allocate any resource to the V2X bearer. More specifically, the base station may postpone the resource allocation for the V2X bearer.

In step S1106, the base station may send a response by using an Initial Context Setup Response message. The Initial Context Setup Response message may include an E-RAB Failed to Setup List, and the E-RAB Failed to Setup List may include a new cause value. The E-RAB Failed to Setup List may be a list of IDs for E-RABs that have failed to be successfully established. The new cause value may indicate that the base station has not allocated a resource for the V2X bearer. The new cause value may indicate that the base station has postponed the resource allocation for the V2X bearer.

In step S1107, if the new cause value is included in the E-RAB Failed to Setup List, the MME/AMF may not deactivate the bearer context that is included in the received E-RAB Failed to Setup List. More specifically, the MME/AMF that has received the E-RAB Failed to Setup List including the new cause value may maintain the bearer context, which is included in the received E-RAB Failed to Setup List.

In step S1108, the base station may transmit an RRC Connection Reconfiguration message to the UE. The RRC Connection Reconfiguration message may include an indication (or indicator) indicating that the base station has not allocated any resource for the V2X bearer. The RRC Connection Reconfiguration message may include an indication (or indicator) indicating that the base station has postponed the resource allocation for the V2X bearer. Additionally, the indication may include bearer related information. For example, the bearer related information may be a bearer identifier (ID).

In step S1109, when the indication is included in the RRC Connection Reconfiguration message, the UE may not re-activate and deactivate the indicated bearer context.

Figure 12:
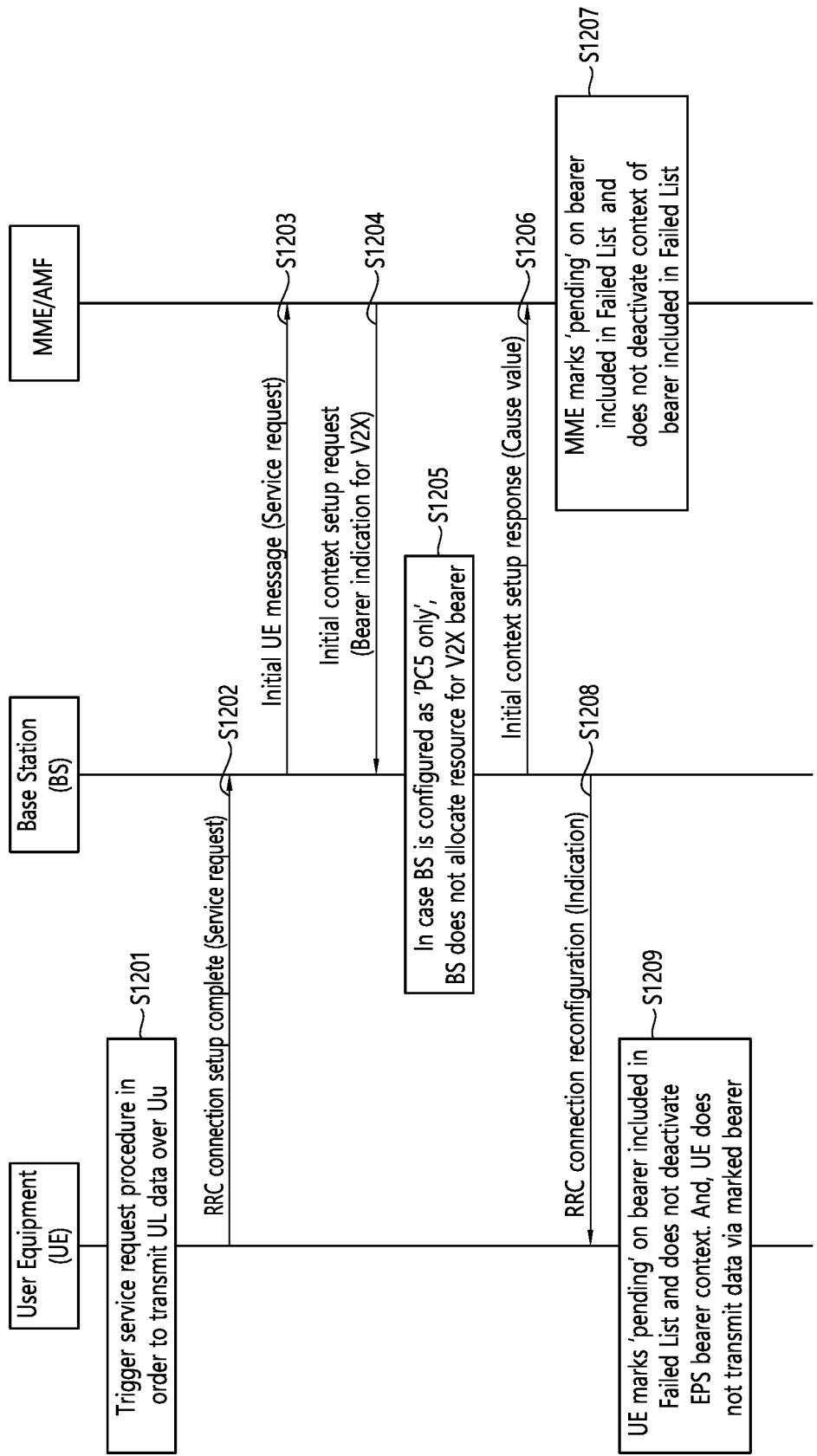
FIG. 12 shows a service request procedure for performing switching between a PC5-based V2X service and a Uu-based V2X service according to an exemplary embodiment of the present invention.

FIG. 12 shows a service request procedure for performing switching between a PC5-based V2X service and a Uu-based V2X service according to an exemplary embodiment of the present invention.

Referring to FIG. 12, in step S1201, the UE may trigger a Service Request procedure for transmitting uplink data over the Uu. The UE may be a V2X capable UE.

In step S1202, the UE may transmit a NAS message Service Request, which is capsulated in an RRC connection setup complete message, to the base station.

In step S1203, the base station may transmit the NAS message Service Request, which includes an Initial UE Message, to an MME/AMF.

In step S1204, when the MME/AMF receives the message, the MME/AMF may transmit an Initial Context Setup Request message to the base station. The Initial Context Setup Request message may include a V2X bearer indication. The V2X bearer indication may indicate whether or not the requested bearer is the V2X bearer.

In step S1205, the base station may determine which one of 'Uu only', 'PC5 only', and 'both Uu and PC5' is configured in the base station for the V2X transmission. When the base station is configured as 'PC5 only' and receives an initial context setup request message including a V2X bearer indication corresponding to the requested bearer, the base station may store the V2X bearer indication corresponding to each V2X bearer and may not allocate any resource to the V2X bearer. More specifically, the base station may postpone the resource allocation for the V2X bearer.

In step S1206, the base station may send a response by using an Initial Context Setup Response message. The Initial Context Setup Response message may include an E-RAB Failed to Setup List, and the E-RAB Failed to Setup List may include a new cause value. The E-RAB Failed to Setup List may be a list of IDs for E-RABs that have failed to be successfully established. The new cause value may indicate that the base station has not allocated a resource for the V2X bearer. The new cause value may indicate that the base station has postponed the resource allocation for the V2X bearer.

In step S1207, if the new cause value is included in the E-RAB Failed to Setup List, the MME/AMF may perform marking on a bearer that is included in the E-RAB Failed to Setup List. For example, the MME/AMF may mark 'pending' on a bearer that is included in the E-RAB Failed to Setup List. Additionally, the MME/AMF may not deactivate the bearer context that is included in the received E-RAB Failed to Setup List. More specifically, the MME/AMF that has received the E-RAB Failed to Setup List including the new cause value may maintain the bearer context, which is included in the received E-RAB Failed to Setup List.

In step S1208, the base station may transmit an RRC Connection Reconfiguration message to the UE. The RRC Connection Reconfiguration message may include an indication (or indicator) indicating that the base station has not allocated any resource for the V2X bearer. The RRC Connection Reconfiguration message may include an indication (or indicator) indicating that the base station has postponed the resource allocation for the V2X bearer. Additionally, the indication may include bearer related information. For example, the bearer related information may be a bearer identifier (ID).

In step S1209, when the indication is included in the RRC Connection Reconfiguration message, the UE may perform marking on the bearer that is included in the failed list. For example, the UE may mark 'pending' on a bearer that is included in the E-RAB Failed to Setup List. Additionally, the UE may not deactivate an EPS bearer context for the marked bearer. Therefore, the UE that has received the RRC Connection Reconfiguration message including the indication may maintain the context of the V2X bearer. Additionally, the UE may not transmit data through the marked bearer.

Figure 13:
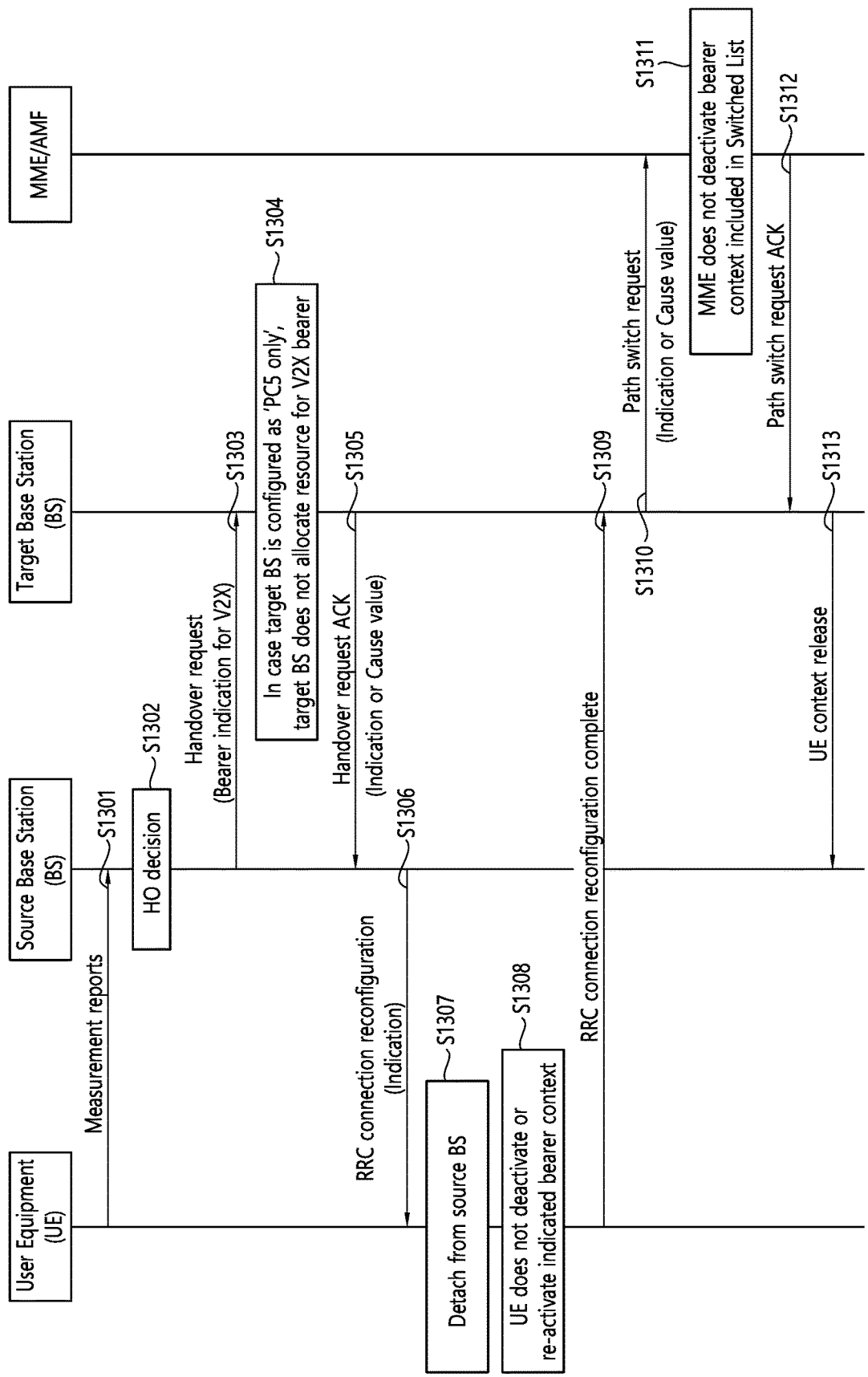
FIG. 13 shows a handover procedure for performing switching between a PC5-based V2X service and a Uu-based V2X service according to an exemplary embodiment of the present invention.

FIG. 13 shows a handover procedure for performing switching between a PC5-based V2X service and a Uu-based V2X service according to an exemplary embodiment of the present invention.

Referring to FIG. 13, in step S1301, the UE may transmit a Measurement Reports message to a source base station.

In step S1302, the source base station may determine a handover based on the received Measurement Reports message.

In step S1303, the source base station may transmit a Handover Request message to a target base station. The Handover Request message may include a V2X bearer indication. The V2X bearer indication may indicate whether or not the requested bearer is the V2X bearer.

In step S1304, the target base station may determine which one of 'Uu only', 'PC5 only', and 'both Uu and PC5' is configured in the target base station for the V2X transmission. When the target base station is configured as 'PC5 only' and receives a handover request message including a V2X bearer indication corresponding to the requested bearer, the target base station may store the V2X bearer indication corresponding to each V2X bearer and may not allocate any resource to the V2X bearer. More specifically, the target base station may postpone the resource allocation for the V2X bearer.

In step S1305, the target base station that has received the handover request message may transmit a Handover Request Acknowledge message to the source base station as a response to the received handover request message. The Handover Request Acknowledge message may include an E-RABs Admitted List or an E-RABs Not Admitted List, and the E-RABs Admitted List or the E-RABs Not Admitted List may include a new cause value. The Handover Request Acknowledge message may include an indication. The new cause value or indication may indicate that the target base station has not allocated the resource for the V2X bearer. The new cause value or indication may indicate that the target base station has postponed the resource allocation for the V2X bearer.

In step S1306, when the source base station receives a message from the target base station, the source base station may transmit an RRC Connection Reconfiguration message to the UE. The RRC Connection Reconfiguration message may include an indication (or indicator) indicating that the base station has not allocated any resource for the V2X bearer. The RRC Connection Reconfiguration message may include an indication (or indicator) indicating that the base station has postponed the resource allocation for the V2X bearer. Additionally, the indication may include bearer related information. For example, the bearer related information may be a bearer identifier (ID).

In step S1307, when the UE receives a message from the source base station, the UE may perform detachment.

In step S1308, the UE may not re-activate and deactivate the indicated bearer context.

In step S1309, the UE may transmit an RRC Connection Reconfiguration Complete message to the target base station.

In step S1310, the target base station may transmit a Path Switch Request message to the MME/AMF. The Path Switch Request message may include an E-RAB To Be Switched in Downlink List, and the E-RAB To Be Switched in Downlink List may include a new cause value. The Path Switch Request message may include an indication. The new cause value or indication may indicate that the target base station has not allocated the resource for the V2X bearer. The new cause value or indication may indicate that the target base station has postponed the resource allocation for the V2X bearer.

In step S1311, when the MME/AMF receives the message from the target base station, the MME/AMF may not deactivate the bearer context that is included in the list. For example, the MME/AMF that has received the E-RAB To Be Switched in Downlink List including the new cause value may maintain the bearer context, which is included in the E-RAB To Be Switched in Downlink List.

In step S1312, the MME/AMF may respond (or send a response) to the target base station by using a Path Switch Request Acknowledge message.

In step S1313, the target base station may transmit a UE Context Release message to the source base station.

Figure 14:
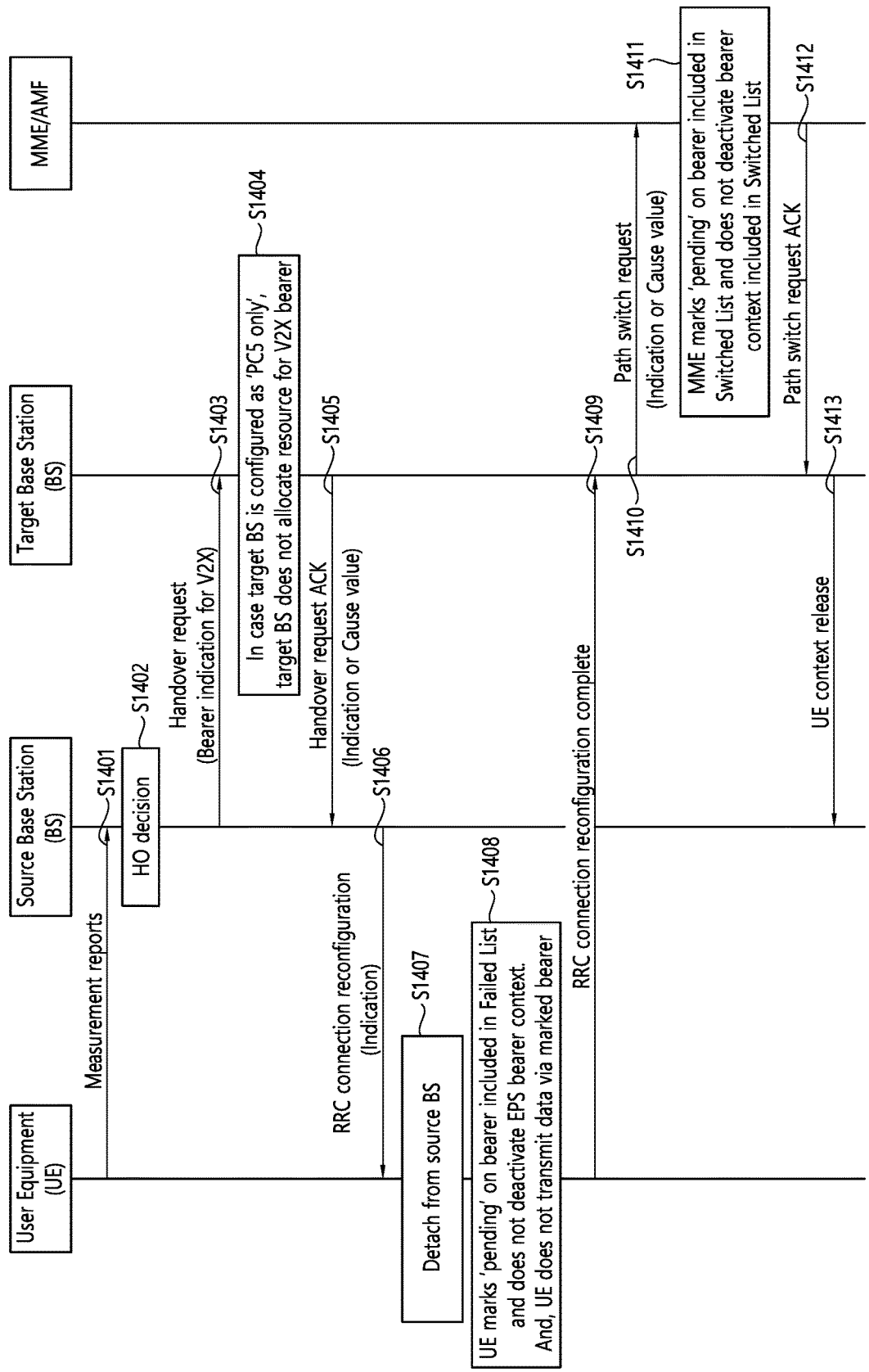
FIG. 14 shows a handover procedure for performing switching between a PC5-based V2X service and a Uu-based V2X service according to an exemplary embodiment of the present invention.

FIG. 14 shows a handover procedure for performing switching between a PC5-based V2X service and a Uu-based V2X service according to an exemplary embodiment of the present invention.

Referring to FIG. 14, in step S1401, the UE may transmit a Measurement Reports message to a source base station.

In step S1402, the source base station may determine a handover based on the received Measurement Reports message.

In step S1403, the source base station may transmit a Handover Request message to a target base station. The Handover Request message may include a V2X bearer indication. The V2X bearer indication may indicate whether or not the requested bearer is the V2X bearer.

In step S1404, the target base station may determine which one of 'Uu only', 'PC5 only', and 'both Uu and PC5' is configured in the target base station for the V2X transmission. When the target base station is configured as 'PC5 only' and receives a handover request message including a V2X bearer indication corresponding to the requested bearer, the target base station may store the V2X bearer indication corresponding to each V2X bearer and may not allocate any resource to the V2X bearer. More specifically, the target base station may postpone the resource allocation for the V2X bearer.

In step S1405, the target base station that has received the handover request message may transmit a Handover Request Acknowledge message to the source base station as a response to the received handover request message. The Handover Request Acknowledge message may include an E-RABs Admitted List or an E-RABs Not Admitted List, and the E-RABs Admitted List or the E-RABs Not Admitted List may include a new cause value. The Handover Request Acknowledge message may include an indication. The new cause value or indication may indicate that the target base station has not allocated the resource for the V2X bearer. The new cause value or indication may indicate that the target base station has postponed the resource allocation for the V2X bearer.

In step S1406, when the source base station receives a message from the target base station, the source base station may transmit an RRC Connection Reconfiguration message to the UE. The RRC Connection Reconfiguration message may include an indication (or indicator) indicating that the base station has not allocated any resource for the V2X bearer. The RRC Connection Reconfiguration message may include an indication (or indicator) indicating that the base station has postponed the resource allocation for the V2X bearer. Additionally, the indication may include bearer related information. For example, the bearer related information may be a bearer identifier (ID).

In step S1407, when the UE receives a message from the source base station, the UE may perform detachment.

In step S1408, the UE may perform marking on the bearer that is included in the failed list and indicated by the new cause value. For example, the UE may mark 'pending' on a bearer that is included in the failed list and indicated by the new cause value. Additionally, the UE may not deactivate an EPS bearer context for the marked bearer. Therefore, the UE that has received the RRC Connection Reconfiguration message including the indication may maintain the context of the V2X bearer. Additionally, the UE may not transmit data through the marked bearer.

In step S1409, the UE may transmit an RRC Connection Reconfiguration Complete message to the target base station.

In step S1410, the target base station may transmit a Path Switch Request message to the MME/AMF. The Path Switch Request message may include an E-RAB To Be Switched in Downlink List, and the E-RAB To Be Switched in Downlink List may include a new cause value. The Path Switch Request message may include an indication. The new cause value or indication may indicate that the target base station has not allocated the resource for the V2X bearer. The new cause value or indication may indicate that the target base station has postponed the resource allocation for the V2X bearer.

In step S1411, if the new cause value is included in the E-RAB To Be Switched in Downlink List, the MME/AMF may perform marking on a bearer that is included in the E-RAB To Be Switched in Downlink List. Alternatively, if the indication is included the Path Switch Request message, the MME/AMF may perform marking on a bearer that is indicated by the indication. For example, the MME/AMF may mark 'pending' on a bearer that is included in the E-RAB To Be Switched in Downlink List. Additionally, the MME/AMF may not deactivate the bearer context that is included in the list. Therefore, the MME/AMF may maintain the bearer context, which is included in the E-RAB To Be Switched in Downlink List.

In step S1412, the MME/AMF may respond (or send a response) to the target base station by using a Path Switch Request Acknowledge message.

In step S1413, the target base station may transmit a UE Context Release message to the source base station.

Figure 15:
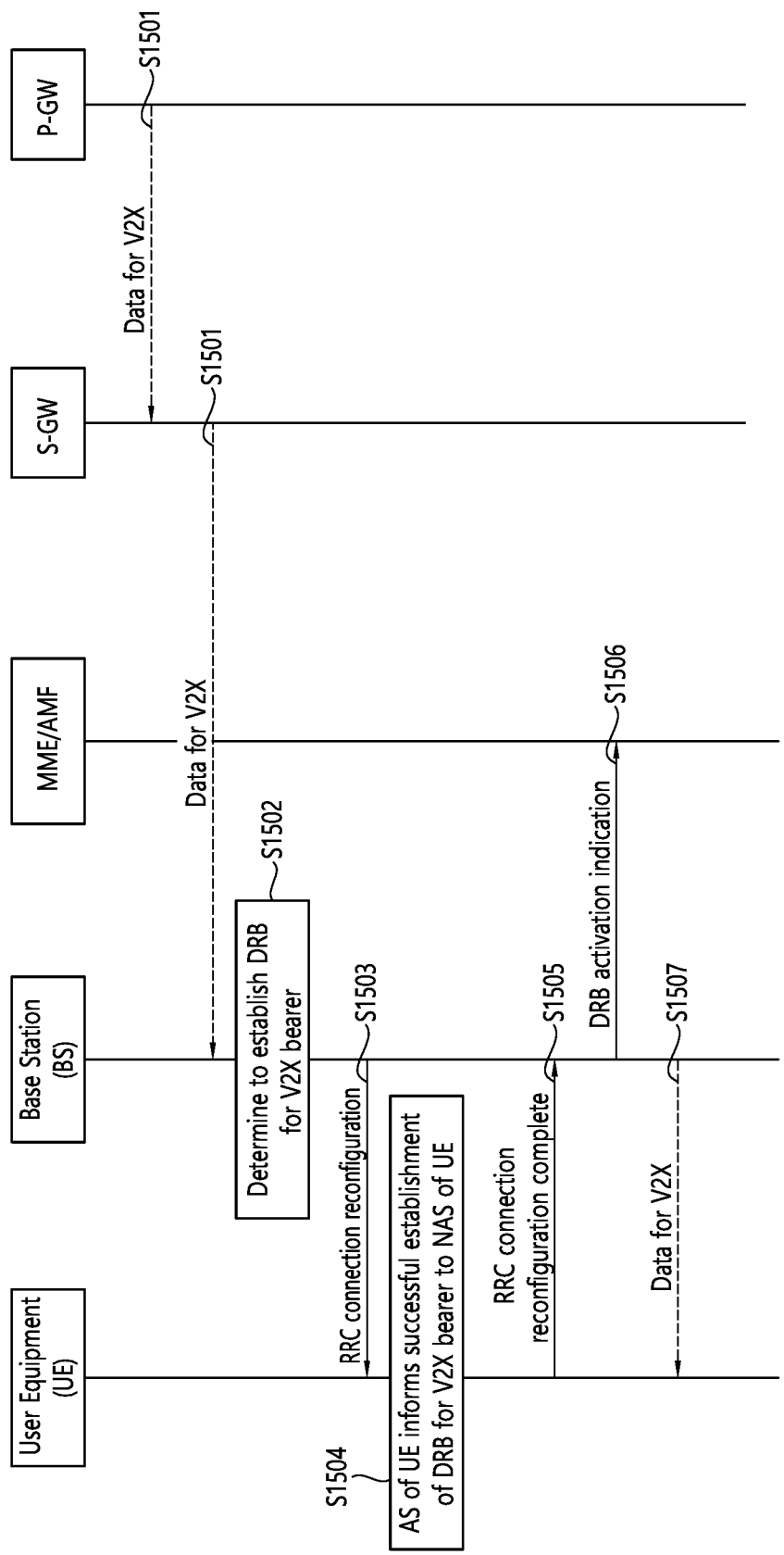
FIG. 15 shows a procedure for initiating a Uu-based V2X service according to an exemplary embodiment of the present invention.

FIG. 15 shows a procedure for initiating a Uu-based V2X service according to an exemplary embodiment of the present invention.

Referring to FIG. 15, in step S1501, a P-GW may transmit a downlink traffic for V2X to the base station via the S-GW.

In step S1502, the base station may determine whether or not to establish a DRB for the V2X bearer. For example, if the base station receives data corresponding to V2X from the S-GW via S1-U, the base station may determine to establish the DRB for the V2X bearer. For example, the base station that has received data corresponding to V2X may perform the postponed resource allocation for the V2X bearer in order to establish the DRB for the V2X bearer.

In step S1503, in order to set up the DRB for the V2X bearer, the base station may transmit an RRC Connection Reconfiguration message to the UE.

In step S1504, if the RRC Connection Reconfiguration message is received from the base station, and if the requested DRB is successfully established, an AS layer of the UE may notify an NAS layer of the UE that the corresponding DRB is successfully established. Thereafter, the UE may remove (or eliminate) markings on all of the bearers. For example, if the requested DRB is successfully established, the UE may remove the 'pending' marking that was performed on the bearer in step S1209 of FIG. 12 or in step S1408 of FIG. 14.

In step S1505, the UE may transmit an RRC Connection Reconfiguration Complete message to the base station.

In step S1506, the base station may transmit information indicating the establishment of the DRB for the V2X bearer to the MME/AMF. The information indicating the establishment of the DRB for the V2X bearer may be a new IE included in a DRB Activation Indication message, an existing message, and a new message or a new IE included in an existing message. After receiving the information, the MME/AMF may acknowledge that the resource is allocated for the indicated V2X bearer. Thereafter, the MME may remove the markings on all of the bearers. For example, the MME/AMF, which has received the information indicating the establishment of the DRB for the V2X bearer, may remove the 'pending' marking that was performed on the bearer in step S1207 of FIG. 12 or in step S1411 of FIG. 14.

In step S1507, the base station may transmit data corresponding to V2X to the UE via the DRB, which is configured for the V2X bearer.

Figure 16:
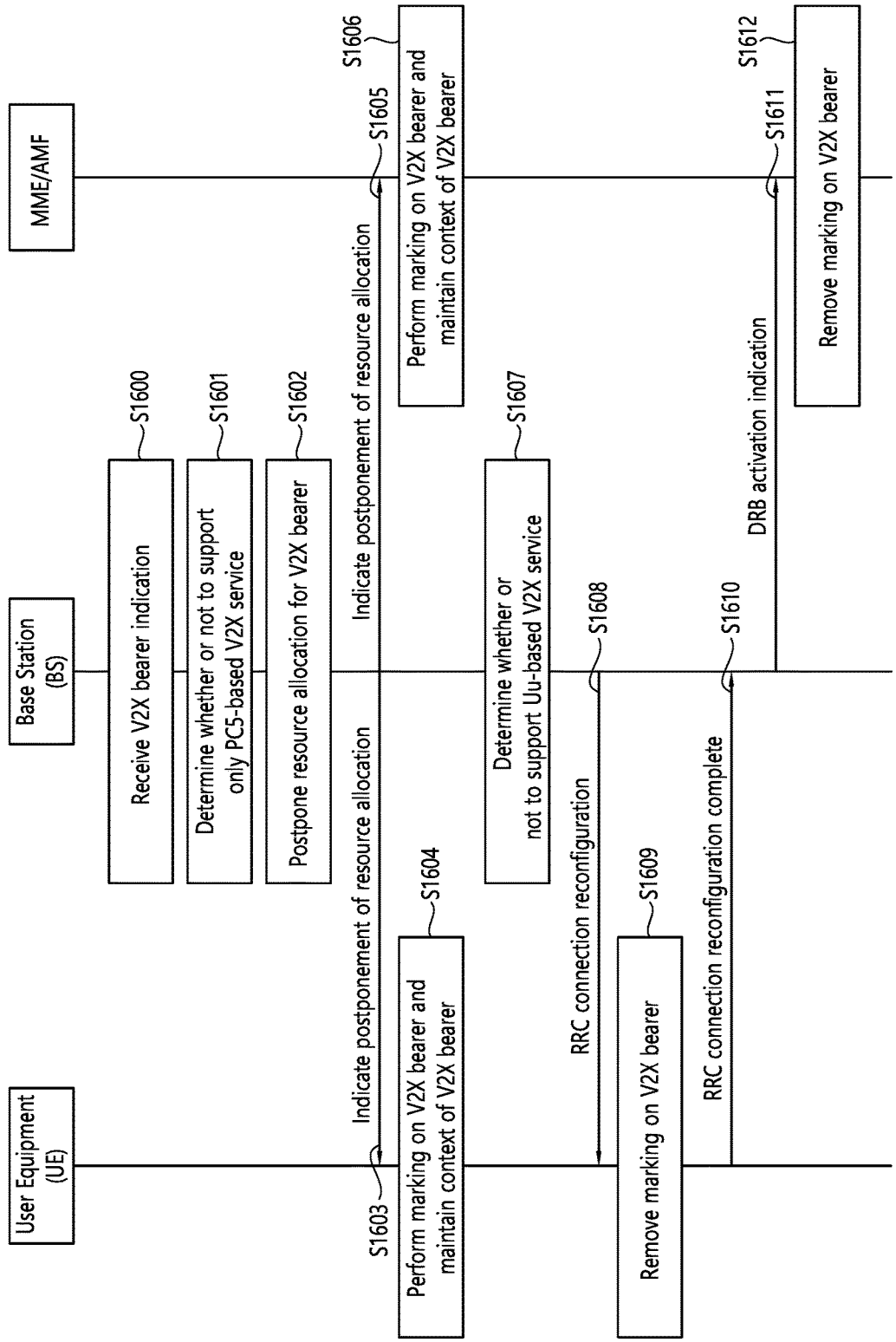
FIG. 16 shows a procedure for switching a PC5-based V2X service and a Uu-based V2X service according to an exemplary embodiment of the present invention.

FIG. 16 shows a procedure for switching a PC5-based V2X service and a Uu-based V2X service according to an exemplary embodiment of the present invention.

Referring to FIG. 16, in step S1600, the base station may receive a V2X bearer indication. The V2X bearer indication may indicate whether or not the requested bearer is a V2X bearer. The V2X bearer indication may be included in an Initial Context Setup Request message and received from the MME/AMF. In case the base station is a target base station, the V2X bearer indication may be included in a handover request message and received from a source base station.

In step S1601, the base station may determine whether or not the base station will only support the PC5-based V2X service. The base station may optionally support any one or both of the PC5-based V2X service and the Uu-based V2X service.

In step S1602, when it is determined that the base station only supports the PC5-based V2X service, the base station may store a V2X bearer indication corresponding to the V2X bearer and may not allocated any resource to the V2X bearer. More specifically, the base station may postpone the resource allocation for the V2X bearer.

In step S1603, the base station may transmit information, which indicates that the resource allocation for the V2X bearer has been postponed by the base station, to a user equipment (UE). The information may be at least any one of an indication or a cause value. The information may be transmitted to the UE by being included in an RRC Connection Reconfiguration message.

In step S1604, the UE may perform marking on the V2X bearer and may maintain the context of the marked V2X bearer. Therefore, even though the current base station provides only PC5-based V2X service, the context of the V2X bearer may be maintained, and the V2X bearer may not be released. Furthermore, the UE may stop (or interrupt) the data transmission via V2X bearer.

In step S1605, the base station may transmit information, which indicates that the resource allocation for the V2X bearer has been postponed by the base station, to an MME/AMF. The information may be at least any one of an indication or a cause value. The information may be transmitted to the MME/AMF by being included in an Initial Context Setup Request message. The information may be transmitted to the MME/AMF by being included in a Path Switch Request message.

In step S1606, the MME/AMF may perform marking on the V2X bearer and may maintain the context of the marked V2X bearer. Therefore, even though the current base station provides only PC5-based V2X service, the context of the V2X bearer may be maintained, and the V2X bearer may not be released.

The order of steps S1603/S1604 and steps S1605/S1606 may be interchanged. More specifically, the base station may first transmit the information, which indicates that the resource allocation for the V2X bearer has been postponed by the base station, to the MME/AMF and may then transmit the information to the UE.

In step S1607, the base station may determine whether or not the base station supports Uu-based V2X service. If the base station determines that it will support the Uu-based V2X service, the base station may perform the postponed resource allocation for the V2X bearer.

In step S1608, the base station may transmit an RRC Connection Reconfiguration message to the UE.

In step S1609, after successfully establishing an RRC connection, the UE may remove (or eliminate) the marking on the V2X bearer.

In step S1610, the UE may transmit an RRC Connection Reconfiguration Complete message to the base station.

In step S1611, the base station may transmit information, which indicates that the V2X bearer is activated, to the MME/AMF.

In step S1612, the MME/AMF may remove (or eliminate) the marking on the V2X bearer.

According to the exemplary embodiment of the present invention, in case the base station is set to 'PC5 only' as its configuration for the V2X service, the base station may not allocate resource for the bearer that is to be used for V2X. More specifically, the base station may postpone the resource allocation for the V2X bearer. Thereafter, the base station may notify the UE and the MME/AMF that the base station has not allocated the resource for the V2X bearer. The MME/AMF may not deactivate the bearer context based on the information received from the base station. The UE may not attempt to release a radio bearer that is indicated based on the information received from the base station. Therefore, even though the configuration for V2X of the base station is set to 'PC5 only', the V2X bearer may not be released and may be maintained.

Furthermore, in case the base station modifies the configuration for the V2X service to 'Uu only' or 'both Uu and PC5', the base station may activate the resource allocation for the V2X bearer, and the UE may use the maintained V2X bearer so as to swiftly receive V2X data.

The procedure that is proposed in this specification may be applied to a case where the UE moves to a base station that is configured as 'PC5 only'. The procedure that is proposed in this specification may be applied to a case where a base station that was previously configured as 'Uu only' or 'both Uu and PC5' modifies its configuration to 'PC5 only'. Furthermore, the proposed procedure may also be applied to signaling between RAN and CN in a 5G architecture, which is similar to the handover procedure or service request procedure in LTE.

Figure 17:
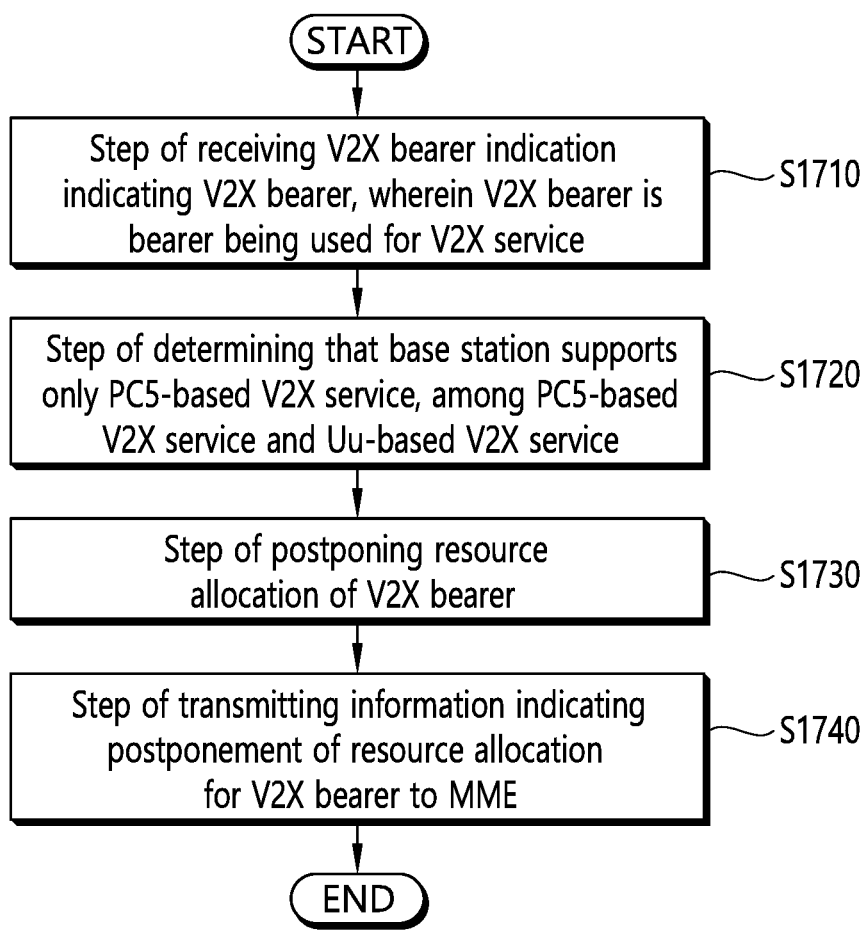
FIG. 17 shows a method for performing V2X communication by a base station according to an exemplary embodiment of the present invention.

FIG. 17 shows a method for performing V2X communication by a base station according to an exemplary embodiment of the present invention.

Referring to FIG. 17, in step S1710, the base station may receive a V2X bearer indication indicating a V2X bearer. The V2X bearer may be a bearer that is used for a V2X service.

In step S1720, among a PC5-based V2X service and a Uu-based V2X service, the base station may determine that it will support only the PC5-based V2X service.

In step S1730, the base station may postpone the resource allocation for the V2X bearer. If the base station determines that it will support only the PC5-based V2X service, the resource allocation for the V2X bearer may be postponed.

In step S1740, the base station may transmit information indicating that the resource allocation for the V2X bearer will be postponed to a mobility management entity (MME).

Additionally, the base station may transmit information indicating that the resource allocation for the V2X bearer will be postponed to the UE. The base station may be a target base station, and the information being transmitted to the UE may be transmitted to the UE via a source base station. The information may include an identifier (ID) of the V2X bearer.

Additionally, the base station may determine that it will support the Uu-based V2X service, and the base station may allocate resource for the V2X bearer. Thereafter, the base station may establish a DRB for the V2X service based on the resource, which is allocated for the V2X bearer. And, then, the base station may transmit information indicating the establishment of the DRB for the V2X bearer to the MME.

Figure 18:
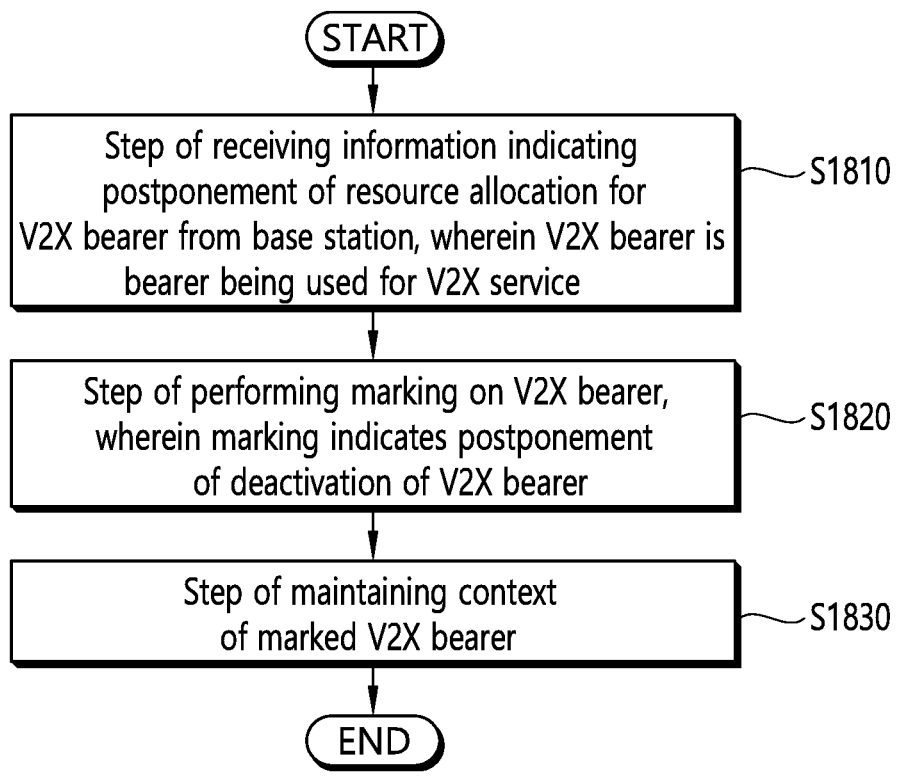
FIG. 18 shows a method for performing V2X communication by an MME or user equipment (UE) according to an exemplary embodiment of the present invention.

FIG. 18 shows a method for performing V2X communication by an MME or user equipment (UE) according to an exemplary embodiment of the present invention.

Referring to FIG. 18, in step S1810, a device may receive information indicating that the resource allocation for the V2X bearer will be postponed from the base station. The V2X bearer may be a bearer that is used for a V2X service. The device may be an MME or user equipment (UE).

In step S1820, the device may perform marking, which indicates a postponement of the deactivation of the V2X bearer, on the V2X bearer. Among a PC5-based V2X service and a Uu-based V2X service, if the base station supports only the PC5-based V2X service, the resource allocation for the V2X bearer may be postponed by the base station.

In step S1830, the device may maintain the context of the marked V2X bearer.

Additionally, if the device is an MME, the device may receive information indicating the establishment of the DRB for the V2X bearer from the base station. If the information indicating the establishment of the DRB is received, the device may remove the marking on the V2X bearer.

Additionally, if the device is a UE, the device may receive an RRC connection reconfiguration message from the base station. If the RRC connection reconfiguration message is received, the UE may remove the marking on the V2X bearer. An AS layer of the UE may notify that the DRB for the V2X bearer is established to an NAS of the UE.

Figure 19:
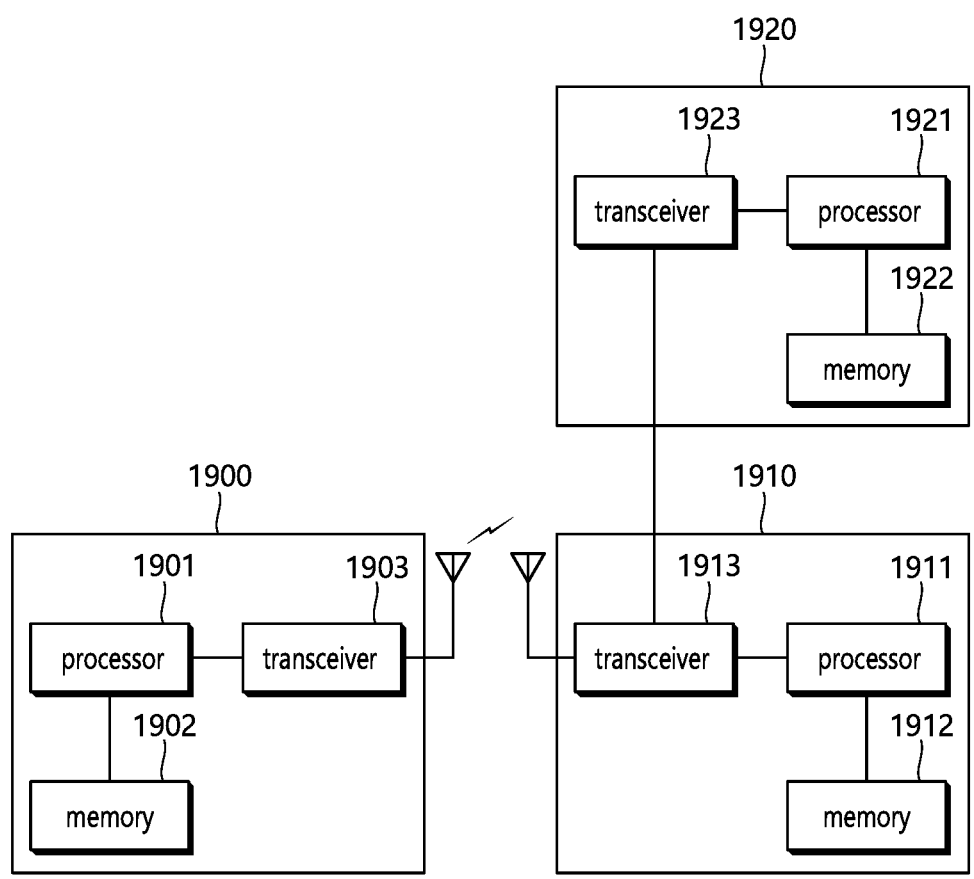
FIG. 19 is a block diagram illustrating a wireless communication system according to the embodiment of the present invention.

FIG. 19 is a block diagram illustrating a wireless communication system according to the embodiment of the present invention.

A UE (1900) includes a processor (1901), a memory (1902) and a transceiver (1903). The memory (1902) is connected to the processor (1901) and stores various information for driving the processor (1901). The transceiver (1903) is connected to the processor (1901), and transmits and/or receives radio signals. The processor (1901) implements proposed functions, processes and/or methods. In the above embodiment, an operation of the UE may be implemented by the processor (1901).

A BS (1910) includes a processor (1911), a memory (1912), and a transceiver (1913). The memory (1912) is connected to the processor (1911), and stores various types of information for driving the processor (1911). The transceiver (1913) is connected to the processor (1911), and transmits and/or receives radio signals. The processor (1911) implements proposed functions, processes and/or methods. In the above embodiment, an operation of the BS may be implemented by the processor (1911).

An MME/AMF (1920) includes a processor (1921), a memory (1922), and a transceiver (1923). The memory (1922) is connected to the processor (1921), and stores various types of information for driving the processor (1921). The transceiver (1923) is connected to the processor (1921), and transmits and/or receives radio signals. The processor (1921) implements proposed functions, processes and/or methods. In the above embodiment, an operation of the MME/AMF may be implemented by the processor (1921).

The processor may include an application-specific integrated circuit (ASIC), a separate chipset, a logic circuit, and/or a data processing unit. The memory may include a read-only memory (ROM), a random access memory (RAM), a flash memory, a memory card, a storage medium, and/or other equivalent storage devices. The transceiver may include a base-band circuit for processing a wireless signal. When the embodiment is implemented in software, the aforementioned methods can be implemented with a module (i.e., process, function, etc.) for performing the aforementioned functions. The module may be stored in the memory and may be performed by the processor. The memory may be located inside or outside the processor, and may be coupled to the processor by using various well-known means.

Various methods based on the present specification have been described by referring to drawings and reference numerals given in the drawings based on the aforementioned examples. Although each method describes multiple steps or blocks in a specific order for convenience of explanation, the invention disclosed in the claims is not limited to the order of the steps or blocks, and each step or block can be implemented in a different order, or can be performed simultaneously with other steps or blocks. In addition, those ordinarily skilled in the art can know that the invention is not limited to each of the steps or blocks, and at least one different step can be added or deleted without departing from the scope and spirit of the invention.

The aforementioned embodiment includes various examples. It should be noted that those ordinarily skilled in the art know that all possible combinations of examples cannot be explained, and also know that various combinations can be derived from the technique of the present specification. Therefore, the protection scope of the invention should be determined by combining various examples described in the detailed explanation, without departing from the scope of the following claims.

What is claimed is:

1. A method for performing vehicle to everything (V2X) communication by a user equipment (UE) in a wireless communication system, comprising:

receiving information indicating a postponement of resource allocation for a V2X bearer from a base station, wherein the V2X bearer is a bearer being used for V2X service;

based on receiving the information, postponing a deactivation of the V2X bearer and maintaining a context of the V2X bearer, wherein, the resource allocation for the V2X bearer is postponed by the base station, based on the base station which supports only PC5-based V2X service, among PC5-based V2X service and Uu-based V2X service;

while postposting the deactivation of the V2X bearer:
   receiving a radio resource control (RRC) connection reconfiguration message from the base station; and
   based on receiving the RRC connection reconfiguration message, determining not to postpone the deactivation of the V2X bearer.

2. The method of claim 1,
wherein an access stratum (AS) layer of the UE notifies the establishment of data radio bearer (DRB) for the V2X bearer to an non access stratum (NAS) layer of the UE.

\* \* \* \* \*